(12) United States Patent  (10) Patent No.: US 11,766,912 B2
Charmeau et al.  (45) Date of Patent: Sep. 26, 2023

(54) KNEELING POSITION FOR ELECTRIC MEDIUM-DUTY VEHICLE

(71) Applicant: LES MOTEURS NORDRESA INC., Laval (CA)

(72) Inventors: Mathilde Charmeau, Laval (CA); Ali Idrici, Laval (CA); Sylvain Castonguay, Laval (CA)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/454,788

(22) Filed: Nov. 12, 2021

(65) Prior Publication Data

US 2022/0185055 A1  Jun. 16, 2022

Related U.S. Application Data

(60) Provisional application No. 63/125,321, filed on Dec. 14, 2020.

(51) Int. Cl.
*B60G 17/017* (2006.01)
*B60G 17/052* (2006.01)
(Continued)

(52) U.S. Cl.
CPC ....... *B60G 17/017* (2013.01); *B60G 17/0155* (2013.01); *B60G 17/033* (2013.01); *B60G 17/048* (2013.01); *B60G 17/0525* (2013.01); *B60L 50/66* (2019.02); *B60G 2202/15* (2013.01); *B60G 2300/02* (2013.01);
(Continued)

(58) Field of Classification Search
CPC .. B60G 17/017; B60G 17/018; B60G 17/019; B60G 17/01933; B60G 17/01935; B60G 17/0528; B60G 17/0155; B60G 17/0164; B60G 17/033; B60G 17/048; B60G 2202/15; B60G 2400/106; B60G 2500/30
See application file for complete search history.

(56) References Cited

U.S. PATENT DOCUMENTS

| 5,736,935 A | 4/1998 | Lambropoulos |
| 6,454,178 B1 | 9/2002 | Fusco et al. |

(Continued)

FOREIGN PATENT DOCUMENTS

| CA | 2593469 A1 | 1/2008 | |
| DE | 10337900 A1 * | 4/2005 | ........... B60G 17/017 |

(Continued)

OTHER PUBLICATIONS

Nagakubo, Vehicle Height Adjusting Device for Bus, Dec. 16, 2004, EPO, JP 2004352043 A, Machine Translation of Description (Year: 2004).*

*Primary Examiner* — Drew J Brown
*Assistant Examiner* — Matthew D Lee
(74) *Attorney, Agent, or Firm* — McCoy Russell LLP

(57) ABSTRACT

Methods and systems are provided for adjusting a height of an electric vehicle with an adjustable suspension system. In one example, a method comprises: during a vehicle stop event, adjusting a height of a skateboard frame of an electric vehicle via an adjustable suspension system, based on at least one sensor input indicative of a desired skateboard frame height. In this way, user activities, including loading and unloading, may be facilitated.

14 Claims, 18 Drawing Sheets

(51) Int. Cl.
*B60G 17/015* (2006.01)
*B60G 17/033* (2006.01)
*B60L 50/60* (2019.01)
*B60G 17/048* (2006.01)

(52) U.S. Cl.
CPC .... *B60G 2300/50* (2013.01); *B60G 2400/106* (2013.01); *B60G 2400/204* (2013.01); *B60G 2400/252* (2013.01); *B60G 2401/16* (2013.01); *B60G 2500/30* (2013.01)

(56) References Cited

U.S. PATENT DOCUMENTS

| | | | |
|---|---|---|---|
| 6,552,649 B1 | 4/2003 | Okada et al. | |
| 6,727,800 B1 | 4/2004 | Dutu | |
| 6,850,148 B2 | 2/2005 | Masudaya | |
| 8,203,424 B2 | 6/2012 | Ghabra et al. | |
| 8,413,997 B1 * | 4/2013 | Coombs | B60G 17/017 280/6.151 |
| 8,414,455 B2 | 4/2013 | McCcullough et al. | |
| 9,422,014 B1 * | 8/2016 | Schuck | B60G 5/00 |
| 9,827,825 B2 | 11/2017 | Kwark | |
| 10,380,817 B2 | 8/2019 | Kim et al. | |
| 10,493,893 B2 * | 12/2019 | Matsuoka | B60P 1/436 |
| 11,173,766 B1 * | 11/2021 | Hall | B60G 17/0164 |
| 2007/0227489 A1 | 10/2007 | Ando | |
| 2011/0035104 A1 * | 2/2011 | Smith | B60G 17/017 280/6.151 |
| 2011/0218709 A1 | 9/2011 | Hermann | |
| 2021/0347221 A1 * | 11/2021 | Park | B60G 17/019 |
| 2022/0032704 A1 * | 2/2022 | Desourdy | B60G 17/052 |
| 2022/0205308 A1 * | 6/2022 | Castonguay | E05F 15/76 |

FOREIGN PATENT DOCUMENTS

| | | | | |
|---|---|---|---|---|
| DE | 102008012413 A1 | | 9/2009 | |
| DE | 202017003282 U1 * | | 10/2017 | |
| JP | 3512047 B2 * | | 3/2004 | |
| JP | 2004352043 A * | | 12/2004 | ........... B60G 17/017 |
| JP | 2019081524 A | | 5/2019 | |

* cited by examiner

KNEELING POSITION FOR ELECTRIC
MEDIUM-DUTY VEHICLE

CROSS REFERENCE TO RELATED
APPLICATION

The present application claims priority to U.S. Provisional Application No. 63/125,321, entitled "KNEELING POSITION FOR ELECTRIC MEDIUM-DUTY VEHICLE", and filed on Dec. 14, 2020. The entire contents of the above-listed application are hereby incorporated by reference for all purposes.

TECHNICAL FIELD

The present description relates generally to suspension systems for electric medium-duty vehicles.

BACKGROUND/SUMMARY

An internal combustion engine vehicle may be configured with rear-wheel drive to enhance initial acceleration and increase traction. Increasing interest in reducing fossil fuel combustion has led to efforts to provide electric vehicles. In order to electrically propel such vehicles, a large battery pack may be demanded. The battery pack may be positioned low in the vehicle, such as along a chassis of the vehicle, and may have a large footprint, resulting in packaging constraints along an underside of the vehicle. Furthermore, a low vertical positioning of a floor of the vehicle, and hence the chassis and the battery pack, may be desirable in medium-duty (e.g., commercial) vehicles to enable efficient loading and unloading thereof.

The large size of the battery pack and low floor of the vehicle may demand modifications to various vehicle components and systems. For example, the vehicle may be configured with front-wheel drive instead of rear-wheel drive as a result of the space between the rear wheels being occupied by the vehicle floor. The lack of packaging space between the rear wheels may also demand adjustments to a suspension system at the vehicle rear wheels. In addition, modification of a suspension system at the vehicle's front wheels may be desired to accommodate motorization of the front wheels.

Further, a vehicle user may desire the ability to adjust a height of the floor/chassis of the vehicle, such as by directing the vehicle to move into a kneeling position. For example, in a kneeling position, the vehicle floor height above the ground may be lower relative to a nominal floor height above the ground. For example, a commercial vehicle may be used for transporting and delivering heavy items. As such, a user may desire to lower the vehicle floor to a kneeling position in order to facilitate a process of removing said heavy items. As another example, entering and exiting the vehicle may be made less challenging for a user when the vehicle is in a kneeling position, which may increase user safety. Overall, a commercial vehicle not equipped with a suspension system capable of lowering the vehicle to a kneeling position may decrease customer satisfaction.

In one embodiment, the issues described above may be addressed by a method, comprising: during a vehicle stop event, adjusting a height of a skateboard frame of an electric vehicle via an adjustable suspension system, based on at least one sensor input indicative of a desired skateboard frame height.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-8 are shown approximately to scale.

DETAILED DESCRIPTION

Figure 1:
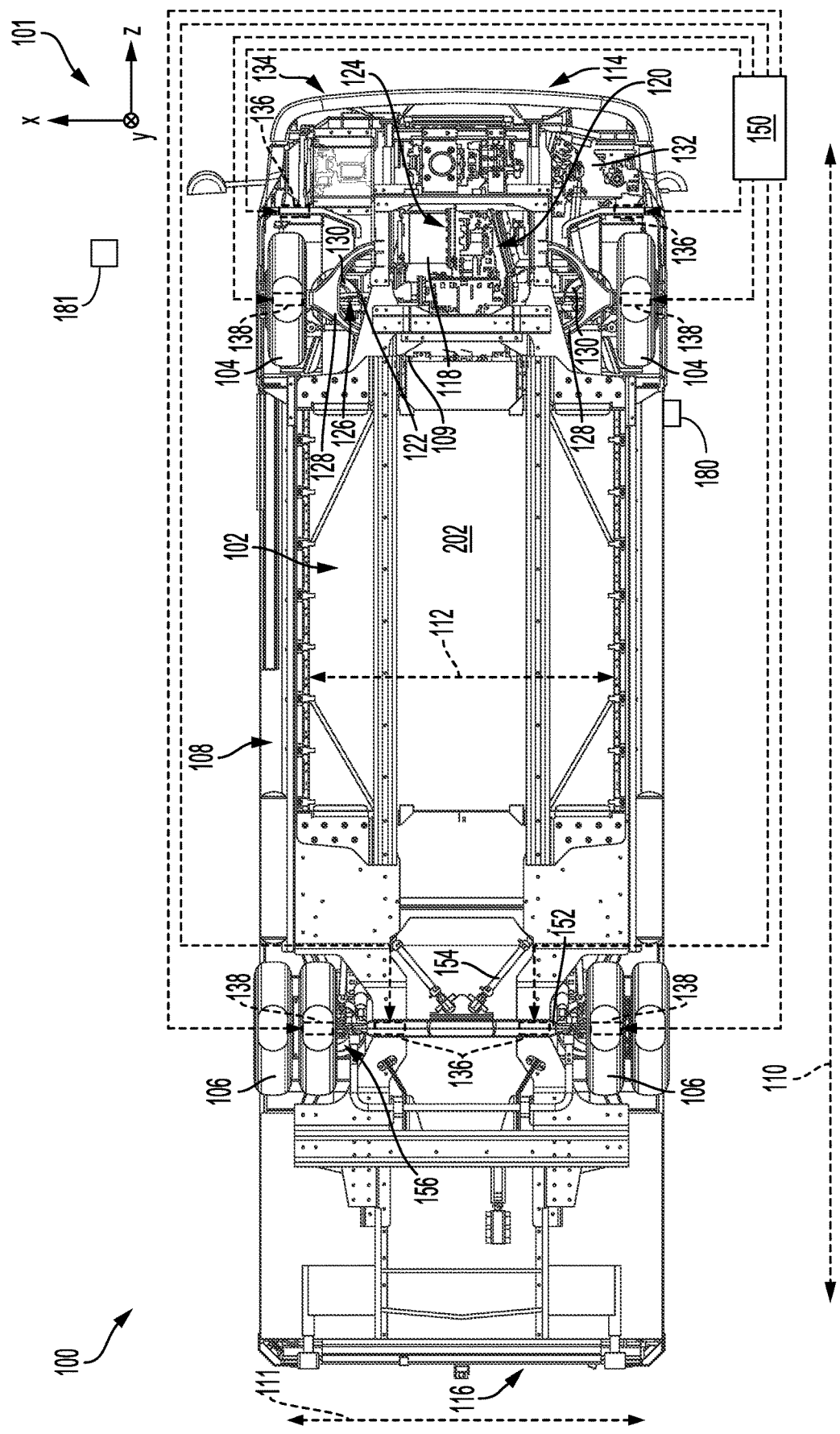
FIG. 1 shows a bottom view of an example of an electric commercial vehicle.
Figure 2A:
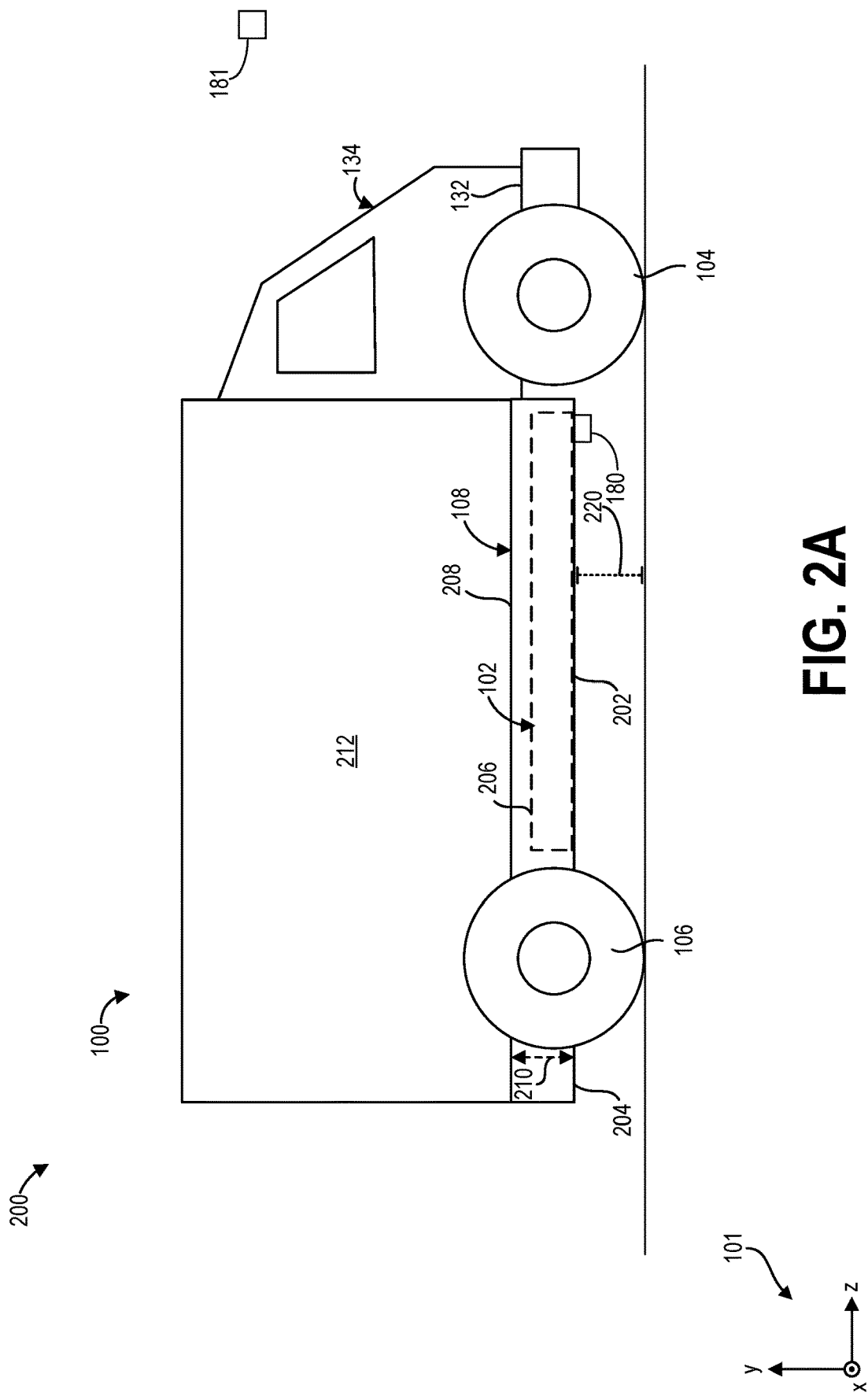
FIG. 2A shows the vehicle of FIG. 1 from a profile view in a nominal position.
Figure 2B:
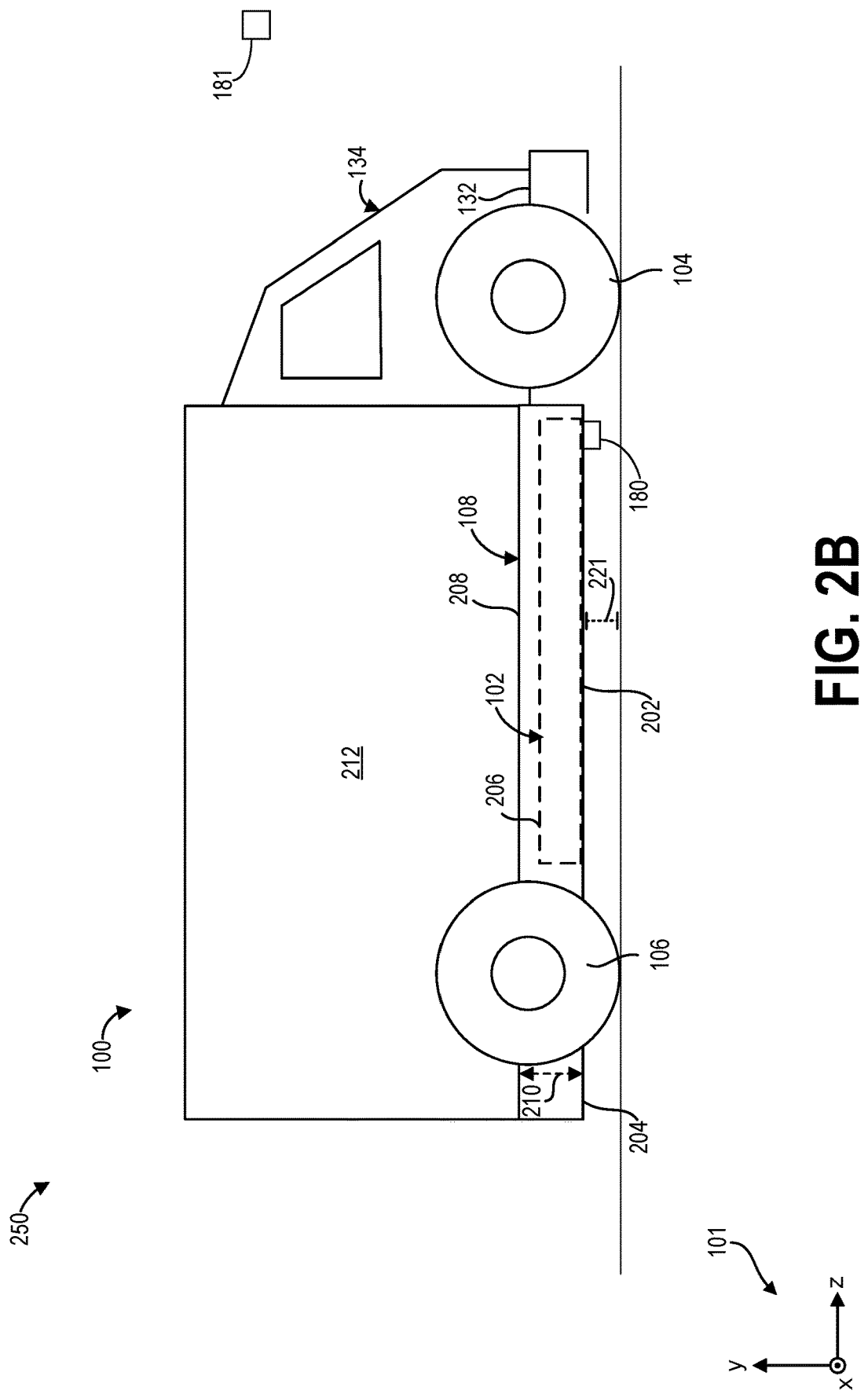
FIG. 2B shows the vehicle of FIG. 1 from a profile view in a first kneeling position.
Figure 2C:
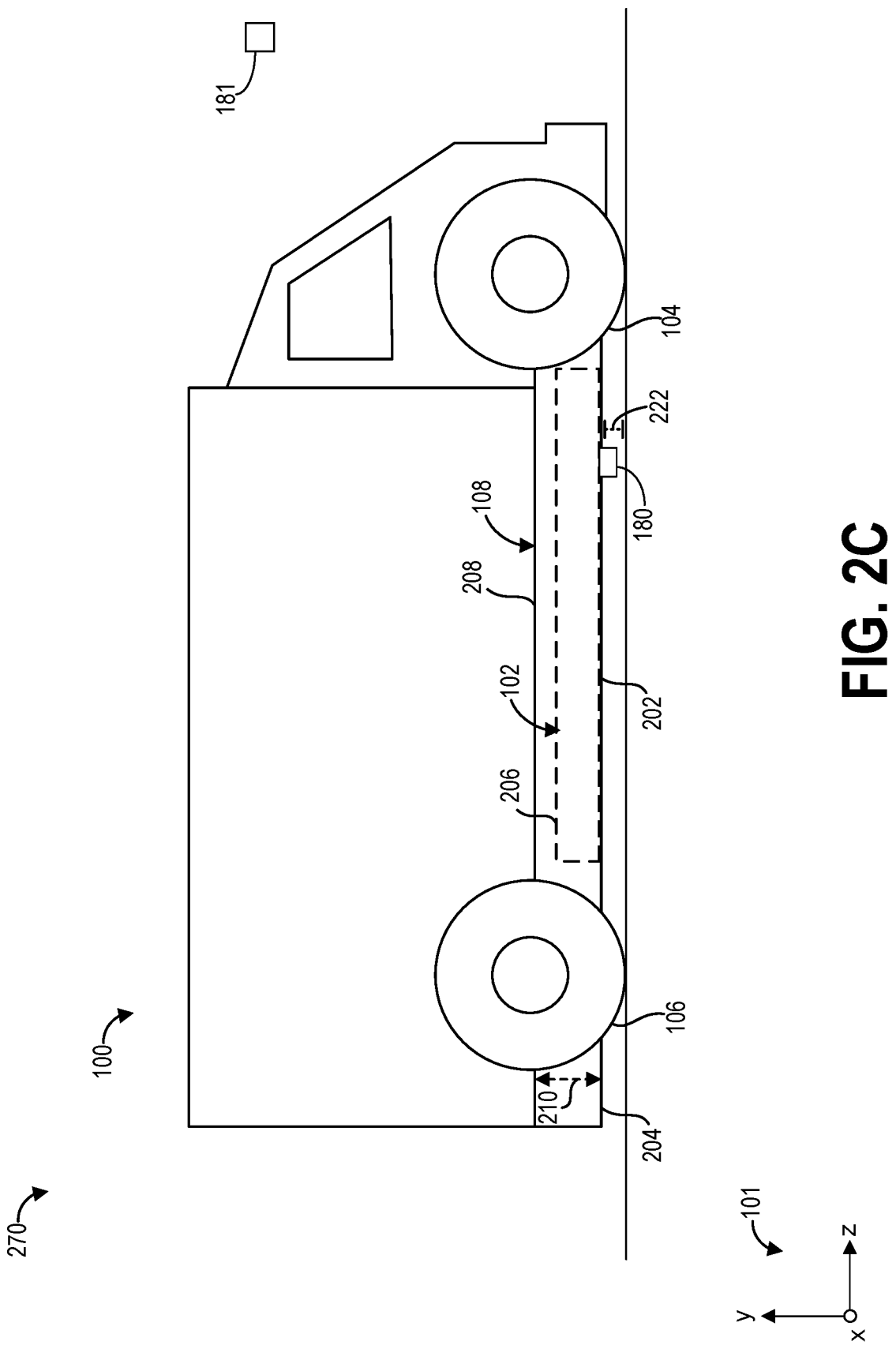
FIG. 2C shows the vehicle of FIG. 1 from a profile view in a second kneeling position.
Figure 3:
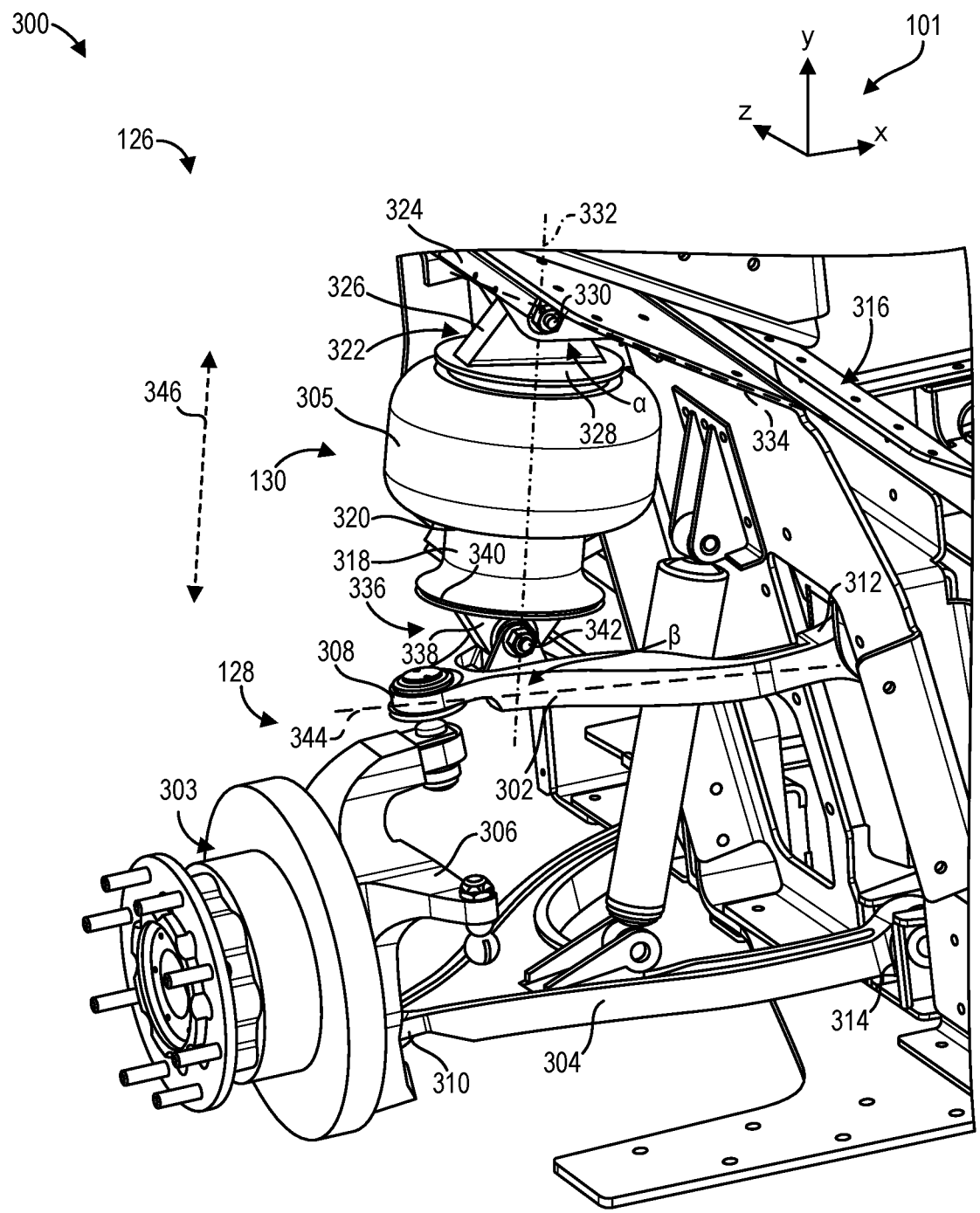
FIG. 3 shows an example of a front suspension system which may be implemented in the vehicle of FIGS. 1 and 2A-2C.
Figure 4:
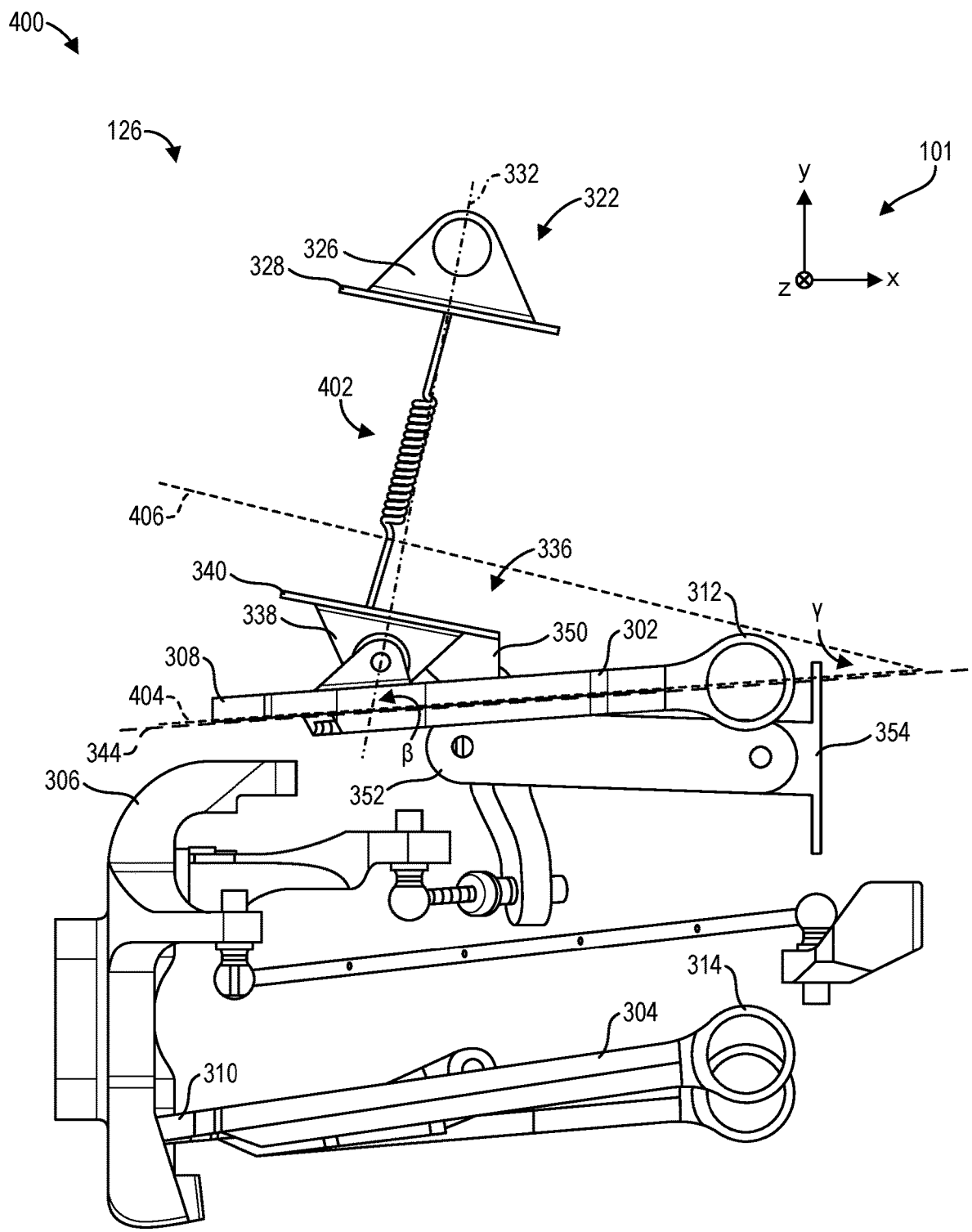
FIG. 4 shows the example of the front suspension system of FIG. 3 in a first position.
Figure 5:
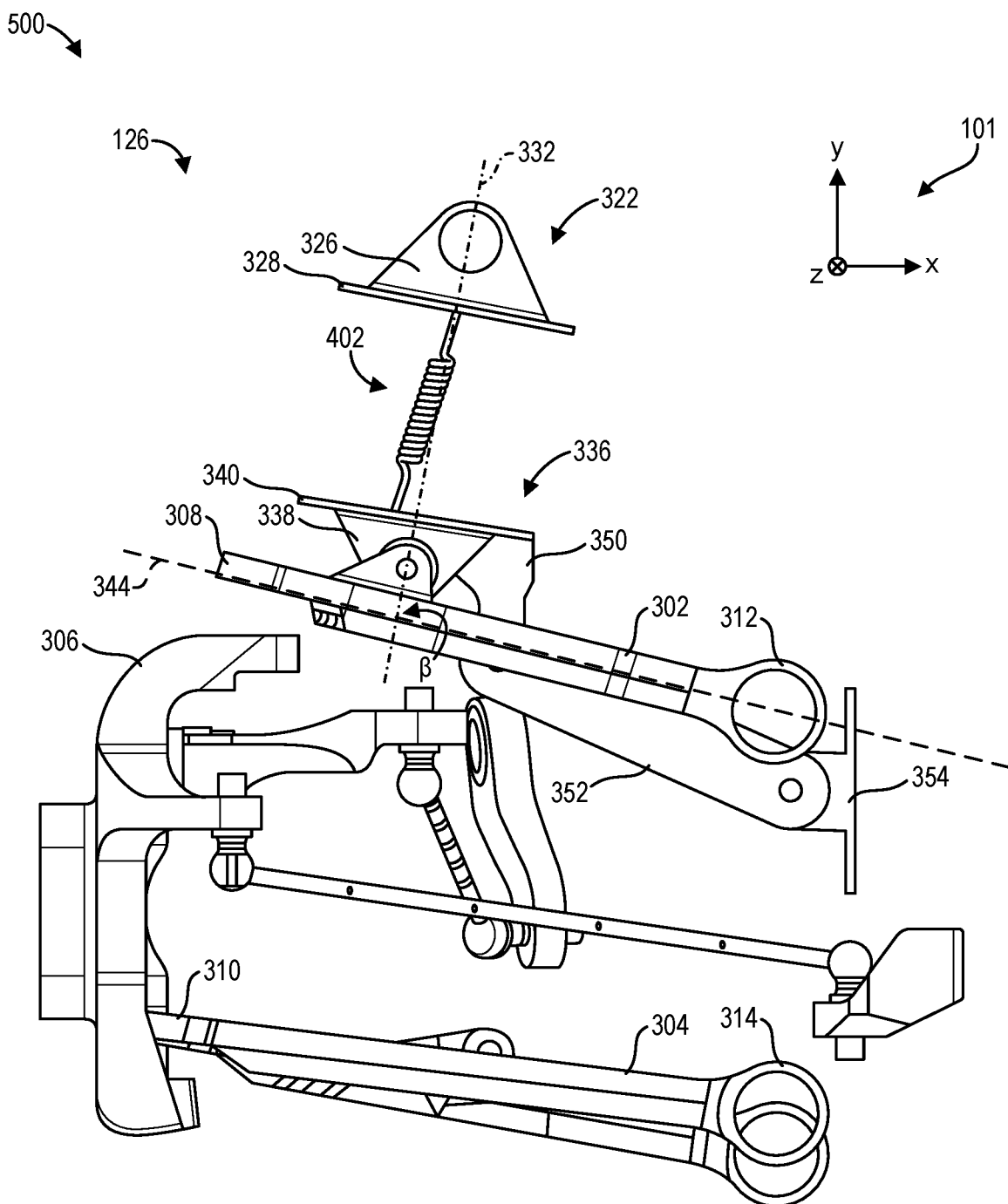
FIG. 5 shows the example of the front suspension system of FIG. 3 in a second position.
Figure 6:
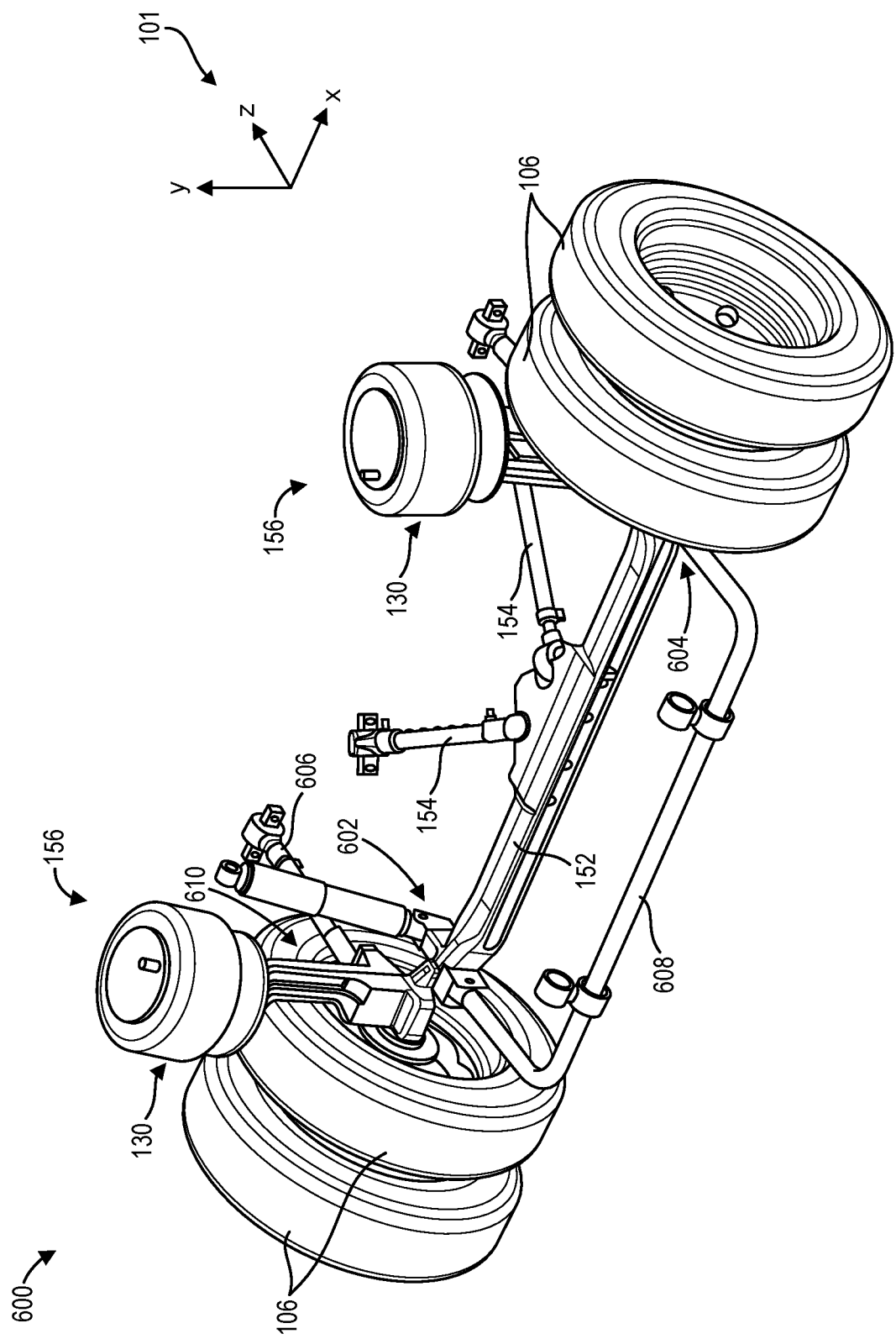
FIG. 6 shows an example of a rear suspension system which may be implemented in the vehicle of FIGS. 1 and 2.

The following description relates to systems and methods for lowering an electric commercial vehicle to accommodate a user. For example, the vehicle may have a skateboard frame, and may lower into a kneeling position in order to facilitate user activities while a vehicle is stopped or as the vehicle is approach a stop. For example, while the vehicle is stopped or approaching the stop (e.g., with vehicle speed below a minimum nonzero speed threshold such as 0.5-5 MPH), the skateboard frame may be lowered into a kneeling position based on a sensor input indicative of a desired vehicle position, in order to allow a user to exit and/or enter the vehicle, and to facilitate loading and unloading the vehicle. In some examples, the low floor may be a chassis of the vehicle with an integrated battery pack and a skateboard frame, as shown in FIGS. 1-2C. In one example, the vehicle of FIG. 1 may be in a nominal operating position (e.g., not in a kneeling position), as shown in FIG. 2A, and may be further lowered to one or more kneeling positions in response to one or more inputs. For example, FIG. 2B shows the vehicle of FIG. 1 in a first kneeling position, and FIG. 2C shows the vehicle of FIG. 1 a second kneeling position. To accommodate such a low positioning of the chassis and the integrated battery pack, the vehicle may be adapted with front-wheel drive. However, implementation of front-wheel drive in the vehicle may demand reconfiguration of a front suspension system of the vehicle. An example of an air suspension system at the front axle is depicted in FIG. 3. The front suspension system may combine a double wishbone suspension with a pressurized spring, such as an air spring. The air spring may be configured with a leveling link to accommodate angular changes in the double wishbone suspension without demanding installation of an axial guide. An angular motion of the double wishbone suspension and pivoting of the leveling link in response to the angular motion is illustrated in FIGS. 4 and 5 where the front axle air suspension system is shown in a first position and a second position, respectively. An air suspension system may also be implemented at a rear axle of the vehicle. An example of a rear suspension system is shown in FIG. 6. The rear suspension system is further shown in greater detail in FIGS. 7 and 8. The suspension system shown in FIGS. 2-8 may enable the vehicle to be lowered into at least one kneeling position, such as one or both of the kneeling positions shown in FIGS. 2B-2C. A method for lowering the vehicle chassis in a kneeling position is shown in FIG. 9. Further, a method for transitioning the vehicle chassis between a kneeling position, a static position, and a maximum height position is shown in FIGS. 10A-10G.

FIGS. 1-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, a commercial vehicle 100 may have an electrical system configured with a battery pack 102 as a prime mover providing electrical energy for propulsion. A set of reference axes 101 are provided for comparison between views shown, indicating a y-axis, an x-axis, and a z-axis. In one example, the y-axis may be parallel with a direction of gravity and a vertical direction, the x-axis parallel with a horizontal direction, and the z-axis parallel with a transverse direction and a longitudinal axis of the vehicle 100, e.g., parallel with a length of the vehicle 100. The view shown in FIG. 1 is a z-x planar view, as shown by reference axes 101. The vehicle 100 may be one of a variety of vehicle types, including light commercial vehicles, buses of different sizes, medium- and commercial trucks, vocational vehicles, etc. The battery pack 102 may be an energy storage device configured to deliver electrical power to various components of the electrical system of the vehicle 100 including supplying current to motors coupled to front wheels 104 and/or rear wheels 106 of the vehicle 100. The battery pack 102 may extend along a chassis 108 of the vehicle 100, between the front wheels 104 and the rear wheels 106, along a portion of a length 110 of the vehicle 100. A width 112 of the battery pack 102 may be similar to a distance between innermost wheels of the rear wheels 106.

In one example, the chassis 108 of the vehicle 100 may be a skateboard chassis 108 in which the battery pack 102 is integrated, e.g., forming a continuous unit with the skateboard chassis 108. The skateboard chassis 108 may extend along a greater portion of the length 110 of the vehicle 100 than the battery pack 102, from a point behind the front wheels 104 to a rear end 116 of the vehicle. However, in other examples, the skateboard chassis 108 may vary in length, e.g., the skateboard chassis 108 may be shorter than depicted in FIG. 1. In one example, as shown in a profile view 200 of the vehicle 100 in FIG. 2, the skateboard chassis 108 may be a platform forming a floor of the vehicle 100. The skateboard chassis 108 may be formed of a solid, durable, strong material, such as aluminum, steel, fiber-reinforced materials, and/or other composite materials, able to withstand and support large loads.

The battery pack 102 may be embedded in the skateboard chassis 108, e.g., enclosed in a recess in the skateboard chassis 108, to form a single integrated structure, and may therefore also be incorporated into the floor of the vehicle 100. A bottom face 202 of the battery pack 102 may form a portion of a bottom surface 204 of the skateboard chassis 108. The battery pack 102 may therefore be biased within the skateboard chassis 108 at a lower region, with respect to the y-axis, of the skateboard chassis 108. However, in other examples, the battery pack 102 may instead be biased at an upper region of the skateboard chassis 108 with an upper face 206 of the battery pack 102 forming a portion of an upper surface 208 of the skateboard chassis 108. In yet other examples, the battery pack 102 may extend along a majority of a height 210 of the skateboard chassis 108.

The skateboard chassis 108 may provide various benefits with respect to efficient assembly and packaging of the vehicle 100. For example, the skateboard chassis 108 may be readily scalable, allowing different types of vehicle bodies to be attached. A low vertical (e.g., with respect to the y-axis) positioning of the battery pack 102 in the vehicle 100 may provide even and balanced weight distribution without adversely affecting an overall balance of the vehicle 100 (depending on a height of a payload of the vehicle 100). Rather, in some examples, the low vertical positioning of the battery pack 102 may even increase the overall balance of the vehicle 100. Furthermore, locating the battery pack 102 in the vehicle floor may increase cabin space while enclosing the battery pack 102 in a durable, rigid structure that supports and shields the battery pack 102 from contact with debris, moving vehicle components, etc.

In some instances, the vehicle 100 may be operated to transport cargo, which may demand manual loading and unloading of objects from a storage compartment 212, as shown in FIG. 2, positioned above the skateboard chassis 108. In order to increase an ease of loading/unloading, a floor of the storage compartment 212 (e.g., the skateboard chassis 108) may be maintained as low as possible, with respect to the y-axis, while providing sufficient ground clearance. Furthermore, as shown in FIG. 1, a width of the skateboard chassis 108, as defined along the x-axis, may be similar to a width 111 of the vehicle 100 to maximize a storage capacity of the storage compartment 212 except at a region between the rear wheels 106 where the width of the skateboard chassis 108 may be similar to the distance between the innermost rear wheels 106. Further still, the vehicle chassis may be further lowered in at least one kneeling position in response to one or both of a user input and a vehicle operating condition, in order to facilitate loading and unloading of objects from the storage compartment 212, such as will be described with respect to the method of FIG. 9.

As shown in FIG. 1, the skateboard chassis 108 may extend from a mid-point along the length 110 of the vehicle 100, behind the front wheels 104 to the rear end 116 of the vehicle 100. The low positioning of the skateboard chassis 108, e.g., the floor of the storage compartment 212, as well as the width of the skateboard chassis 108 may preclude coupling a drive train to a rear axle 140 of the vehicle 100. As such, the vehicle 100 may be configured with front-wheel drive due to available packaging space between the front wheels 104, allowing implementation of a powertrain 124 and a drive train 120 at the front wheels 104.

The powertrain 124 includes a motor 118 arranged between a front end 114 of the vehicle 100 and a front edge 109 of the skateboard chassis 108, as well as between the front wheels 104. The motor 118 may be configured to receive electrical power from the battery pack 102. In one example, the motor 118 may be a motor/generator, able to convert mechanical energy to electrical energy to recharge the battery pack 102. The motor 118 may be coupled to a drive train 120 which, in turn, is coupled to drive shafts 122 of the front wheels 104. The drive train 120 may include components such as a transmission and a differential. The powertrain 124 may further include a torque converter arranged between the motor 118 and the transmission when the transmission is automatic, or a clutch between the motor 118 and the transmission when the transmission is manual or single-gear direct drive. Thus, electrical power drawn from the battery pack 102 by the motor 118 may be converted to torque to drive rotation of the front wheels 104 via the drive train 120. The rear wheels 106 may be trailer wheels rotated together on a single axle 152.

The vehicle 100 may include a first, or front, suspension system 126 at the front wheels 104 to allow relative motion between a floor 132 of a vehicle cabin 134 and the front wheels 104. The vehicle cabin 134 may be a passenger compartment positioned above and supported by the front wheels 104, as shown in FIG. 2. As depicted in FIG. 1, the floor 132 of the vehicle cabin 134 may extend between the front edge 109 of the skateboard chassis 108 and the front end 114 of the vehicle 100 and across the width 111 of the vehicle 100. In some examples, the floor 132 of the vehicle cabin 134 may be positioned vertically higher, e.g., along the y-axis, than the skateboard chassis 108, providing greater ground clearance below the vehicle cabin 134 than below the skateboard chassis 108, as well as space for the powertrain 124 and the drive train 120 between the front wheels 104. The floor 132 of the vehicle cabin 134 may be continuous, in one example, with the skateboard chassis 108, so that adjustment of a vertical position of the chassis and the floor 132 of the vehicle cabin 134 occurs in unison.

The front suspension system 126 may include independent double wishbone or A-arm suspensions 128 having a pair of wishbone arms (as shown in FIGS. 3-5 and described further below) stacked vertically along the y-axis at each of the front wheels 104. When configured as double wishbone suspensions 128, the front suspension system 126 may be readily tuned and optimized, providing a more lightweight and compact mechanism than other types of suspension systems, such as a MacPherson strut, a multi-link suspension, etc. Furthermore, the double wishbone suspensions may provide greater clearance for the drive shafts 122 of the front wheels 104.

The vehicle 100 may further include a second, or rear, suspension system 156 at the rear wheels 106 to allow relative motion between the skateboard chassis 108 and the rear wheels 106. The rear suspension system 156 may include a simpler configuration (e.g., having fewer components) than the front suspension system 126, as the rear wheels 106 may operate with decreased pivoting motion in the x-z plane relative to the front wheels 104 (e.g., the rear wheels 106 may not be steering wheels, and therefore may not pivot substantially during turning of the vehicle 100).

In one example, each of the front and rear suspension systems 126, 156 may be configured as an air suspension system, where an air pump or compressor may be utilized to power each of the front and rear suspension systems 126, 156. Air may be pumped into one or more flexible, expandable devices, thereby inflating the devices and raising the skateboard chassis 108 from a front axle assembly (e.g., the drive shafts 122, the powertrain 124, the drive train 120) or a rear axle assembly (e.g., the axle 152) of the vehicle 100. Implementing the air suspension systems 126, 156 in the vehicle 100 may provide a smoother ride quality than steel spring suspension systems or leaf spring suspension systems. Further, by raising and lowering each of the front suspension system 126 and the rear suspension system 156, the vehicle may be transitioned between a nominal position and at least one kneeling position, wherein the vehicle floor is lower to the ground in the at least one kneeling position, relative to the nominal position. As an example, air may be pumped out of the one or more flexible, expandable devices to lower the skateboard chassis 108 into a first kneeling position, and air may be pumped into the one or more flexible, expandable devices to raise the skateboard chassis 108 back to a nominal position. The first kneeling position may be lower to the ground, relative to the nominal position. By enabling the vehicle to adjust in a kneeling position, the suspension system may increase customer satisfaction and ease of use.

The flexible, expandable device may be an air spring 130 (seen in FIG. 1 positioned at the front suspension system 126, but also present in the rear suspension system 156) with at least a portion of the air spring 130 formed of a flexible, durable material, such as rubber, and readily inflated and deflated. Inflation/deflation of the air spring 130 may be adjusted based on at least one height sensor 136 coupled to the floor 132 of the vehicle cabin 134 and/or the skateboard chassis 108 to measure a vertical position of the floor 132 and/or skateboard chassis 108 proximate to the air spring 130. A pressure of each air spring 130 may be monitored by a pressure sensor 138. The at least one height sensor 136 and the pressure sensors 138 may be communicatively coupled to a controller 150, which may be an electronic control unit (ECU). Thus, the vertical position of the floor 132 and/or the skateboard chassis 108 may be monitored via the at least one height sensor 136 and the pressure sensors 138.

The controller 150 may be a computing device, such as a microcomputer that includes a processor unit, a non-transitory computer-readable storage medium device, input/output ports, memory, and a data bus. The computer-readable storage medium device included in the controller 150 may be programmable with computer readable data representing instructions executable by the processor for performing various control routines and methods. The controller 150 may receive requests from an operator of the vehicle 100 to perform the various control routines and methods. For example, the controller 150 may receive requests from the operator to lower or raise the floor 132 of the vehicle cabin 134 and/or the skateboard chassis 108 by simultaneously or independently compressing or expanding the air spring 130. As another example, the controller 150 may determine to lower or raise the floor 132 of the vehicle cabin 134 and/or the skateboard chassis 108 in response to one or more operating conditions, such as a signal from a proximity sensor, a camera feed, a key fob proximity signal, a motion sensor, etc.

The controller 150 may receive various signals from a plurality of sensors of the vehicle 100 (e.g., the at least one height sensor 136, the pressure sensors 138, etc.) and utilize the information to operate various actuators of the vehicle 100 based on the instructions. For example, the controller 150 may receive data from the at least one height sensor 136 to determine whether the floor 132 of the vehicle cabin 134 is positioned sufficiently high enough to circumvent contact between the floor 132 and the drive shafts 122 at the front wheels 104 when the vehicle 100 encounters uneven terrain. The vehicle 100 may include various other sensors not shown in FIG. 1 to monitor various operating conditions, such as vehicle sensors to monitor parameters such as pressure, temperature, speed, etc., amongst others. For example, vehicle 100 may include one or more sensors for determining a position of a user during an unloading process, such as a proximity sensor, a motion sensor, a key fob, and the like. For example, a key fob 181 may be taken in and out of the vehicle cabin. The key fob 181 may include a wireless communication module, such as a Near Field Communication (NFC) module, in order to communicate with the controller 150 via an NFC connection. For example, the key fob may transmit a signal from a button press via the NFC connection. Further, based on a signal strength of the NFC connection, the controller 150 may determine a key fob proximity, in order to determine a key fob location. For example, controller 150 may determine a user proximity to the vehicle based on the key fob location. Further, vehicle 100 may include one or more proximity and/or motion sensors, such as proximity and motion sensor 180. Proximity and motion sensor 180 may be positioned near a driver's side door of the vehicle, and as such, may be used to determine a driver's proximity to the driver's side door. Further, in some examples, the proximity and motion sensor 180 may be configured to detect certain gestures. For example, a user of the vehicle may perform a gesture (e.g., with a hand or a foot), which the proximity and motion sensor 180 may detect and transmit to the controller 150 as an input.

Further, the controller 150 may receive signals from one or more cameras mounted to the vehicle. For example, one or more cameras may be mounted to an exterior of the vehicle and/or an interior of the vehicle cabin, and a video feed from each of the one or more cameras may be monitored by the controller. Further, in some examples, the vehicle may include at least one microphone for receiving voice commands (not shown). In some examples, the microphone may be configured for voice recognition of users.

FIGS. 2A-2C show profile views of vehicle 100 of FIG. 1. Like components will be numbered the same and not reintroduced. A view 200 of vehicle 100 is shown in FIG. 2A, a view 250 of vehicle 100 is shown in FIG. 2B, and a view 270 of vehicle 100 is shown in FIG. 2C. For example, as shown by reference axes 101, each of view 200, view 250, and view 270 is a z-y planar view. FIG. 2A shows vehicle 100 in a nominal position, such as may be used during nominal operating conditions. For example, while vehicle 100 is driving, the skateboard chassis may be held in the position shown in FIG. 2A by the front suspension 126 and the rear suspension 156. As shown, the vehicle floor may be raised above the ground by a height 220 in the nominal position.

Next, FIG. 2B shows vehicle 100 in a first kneeling position, in which the vehicle floor is lowered relative to the nominal position. For example, as shown, the vehicle floor is raised above the ground by a height 221, which may be less than the height 220. Further, FIG. 2C shows vehicle 100 in a second kneeling position, in which the vehicle floor is above the ground by a height 222, which may be less than both of the height 220 and the height 221. In some examples, vehicle 100 may be configured to have one default kneeling position, such as the first kneeling position and the second kneeling position. In other examples, vehicle 100 may be configured to have a plurality of kneeling positions, such as the first kneeling position, the second kneeling positions, and other kneeling positioned in which the vehicle floor is lower relative to the nominal position. For example, the controller 150 may determine to lower the vehicle to a kneeling position based on operating conditions (e.g., such as one or more of a user input, a camera feed, a voice command, a proximity sensor, a key fob signal, a motion sensor, etc.), and may determine a desired kneeling position based on operating conditions. The controller may lower the vehicle to a kneeling position according to the method of FIG. 9, in some examples. In some examples, when requested by the driver, the controller may raise the vehicle in order to enable driving in snow or on incline plans where additional ground clearance is preferred.

A perspective view 300 of a portion of the front suspension system 126 is shown in FIG. 3. One of the double wishbone suspensions 128 is depicted in FIG. 3, including a first wishbone arm 302 stacked over and spaced away from a second wishbone arm 304. The first wishbone arm 302 and the second wishbone arm 304 may have similar geometries and dimensions, such that an orthographic projection of the first wishbone arm 302 may substantially overlap with an orthographic projection of the second wishbone arm 304 along the y-axis. The first and second wishbone arms 302, 304 may be linked by an upright 306 extending along the y-axis between a first end 308 of the first wishbone arm 302 and a first end 310 the second wishbone arm 304. The upright 306 may be fixedly coupled, e.g., attached via welding, fasteners, etc., to a front wheel hub assembly 303 of one of the front wheels, e.g., the front wheels 104 shown in FIGS. 1 and 2. Second ends 312 of the first wishbone arm 302 and second ends 314 of the second wishbone arm 304 may be coupled to a frame 316 of the vehicle. The vehicle frame 316 may support and couple to the floor of the vehicle cabin, e.g., the floor 132 of the vehicle cabin 134 shown in FIGS. 1-2C.

The front suspension system 126 may also include the air spring 130, as described above, positioned above the front wheel hub assembly 303 with respect to the vehicle (e.g., along a positive direction of the y-axis) and substantially vertical, with respect to the y-axis. Configuring the air spring 130 in this way may permit increased lowering of the vehicle cabin floor relative to alternative configurations (e.g., substantially diagonal with respect to the y-axis, positioned at least partially adjacent to the front wheels along the x-axis, etc.). For example, the air spring may permit the vehicle floor to be lowered into a kneeling position, such as the kneeling positions shown in FIGS. 2B-2C. Further, by positioning the air spring 130 above the front wheel hub assembly 303 (and its corresponding drive shaft), the air spring 130 may not interfere with a desirable coupling of the drive shaft to the wheel. As such, no cost-prohibitive and configuration-specific design is employed herein. Accordingly, it will be appreciated that the air spring 130 described herein may be implemented in many types of commercial vehicles with relative ease. In this way, the generalized configuration of the present disclosure may be implemented in a commercial vehicle to facilitate loading/unloading thereof with ease of implementation and at reduced cost.

As shown in FIG. 3, the air spring 130 has an air bag 305 which may be coupled to and partially surround a stem 318. The air bag 305 may be formed of a flexible, durable material, such as rubber, and the stem 318 of the air spring 130 may be formed of a more rigid material. An upper portion (not shown), relative to the y-axis, of the stem 318 may protrude into an interior volume of the air spring 130. A bottom edge 320 of the air bag 305 may seal around the stem 318 so that the air bag 305 is a closed structure and air inside of the air bag 305 does not exchange with air outside of the air bag 305. The air bag 305 may be coupled to the vehicle frame 316 by a first or upper link 322 extending between a top of the air bag 305 and a first bracket 324 attached to the vehicle frame 316, the first link 322 being pivotably coupled to the first bracket 324.

The first link 322 may have a first triangular portion 326 extending upwards away from the top of the air spring 130 and a first plate 328 to which the first triangular portion 326 is fixedly (e.g., permanently) coupled. The first plate 328 may be attached (directly coupled) to the top of the air spring 130 via fasteners (not shown), forming a sealed connection between the first plate 328 and the air bag 305. The first triangular portion 326 of the first link 322 may be coupled to the first bracket 324 with a first fastener 330. The first triangular portion 326 may be secured to the first bracket 324 such that the first link 322 does not move relative to the first bracket 324 or the vehicle frame 316. For example, regardless of inflation/deflation of the air bag 305 or tilting of the first wishbone arm 302, an angle α between a central axis 332 of the air spring 130 and a plane of the vehicle frame 316 (a cross-section of the plane being indicated by dashed line 334) does not substantially change.

The stem 318 may be attached to the first wishbone arm 302 by a second or lower link 336. Similar to the first link 322, the second link 336 may have a second triangular portion 338, oriented upside-down relative to the first triangular portion 326 of the first link 322, fixedly coupled to a second plate 340. The second plate 340 of the second link 336 may be attached (directly coupled) to a bottom of the stem 318 of the air spring 130 by bolting, welding, adhesive, fasteners, etc. In some examples, the second link 336 may extend between the stem 318 and a second bracket (not shown at FIG. 3), the second link 336 being pivotably coupled to the vehicle frame 316 by coupling to the second bracket via a second fastener (not shown at FIG. 3). For example, the second link 336 may be connected to the upper A-arm with a control arm bushing (located at 342), which may allow it to pivot about a control arm bushing axis, and may also be fastened to plate 338 via fastener 342.

The second link 336 may be a leveling link 336 configured to inhibit buckling of the air spring 130 during pivoting of the first wishbone arm 302 within a target angular range, the target angular range described in further detail below. Accordingly, the triangular portion 338 of the leveling link 336 may be pivotably coupled to the first wishbone arm 302 by a second fastener 342. Specifically, a coupling of the leveling link 336 to the first wishbone arm 302 at the second fastener 342 may be configured to allow the air spring 130 and the first wishbone arm 302 to pivot with respect to one another. For example, an angle β between the central axis 332 and a plane of the first wishbone arm 302 (a cross-section of the plane being indicated by dashed line 344) may vary as the front suspension system 126 is operated. The air bag 305 may be inflated or deflated to adjust a height of the vehicle cabin floor relative to the front axle assembly, causing a height 346 of the air spring 130 to increase or decrease accordingly. The inflation/deflation of the air bag 305 may result in tilting of at least the first wishbone arm 302 relative to the x-z plane (e.g., relative to a horizontal plane). In some examples, the second wishbone arm 304 may tilt in unison with the first wishbone arm 302.

Tilting of the first and second wishbone arms 302, 304, may be enabled by arranging pivotable joints, such as ball joints, at the respective first ends 308, 310 of the first and second wishbone arms 302, 304. As the air bag 305 inflates and the height 346 of the air spring 130 increases, the first end 308 of the first wishbone arm 302 may be driven down, with respect to the y-axis. Conversely, as the air bag 305 deflates and the height 346 of the air spring 130 decreases, the first end 308 of the first wishbone arm 302 may be pulled up, with respect to the y-axis. As described above, the air spring 130 may be fixedly coupled to the vehicle frame 316, at the first link 322, inhibiting rotational movement of the air spring 130 relative to the vehicle frame 316. Without the second link 336 allowing rotational movement between the air spring 130 and the first wishbone arm 302, the stem 318 may be compelled to become misaligned with the central axis 332, e.g., the stem 318 may become tilted relative to the central axis 332. Tilting of the stem 318 may distort the air bag 305, increasing a likelihood of leaks. Further, a maximum change (e.g., lowering) of the height 346 may be decreased by tilting of the stem 318.

In air suspension systems where the air spring 130 has a fixed (e.g., non-pivotable) coupling to the first wishbone arm 302, tilting of the first wishbone arm 302 may be compensated via an axial guiding structure extending along the height 346 of the air spring 130. Further, fixing of the air spring 130 to the first wishbone arm 302 may result in a narrower angular range on the first and second wishbone arms 302, 304, decreasing the maximum change of the height 346.

By adapting the front suspension system 126 with the leveling link 336, a position and alignment of the air spring 130 may be maintained while allowing the first wishbone arm 302 (and the second wishbone arm 304) to pivot through the target angular range. In one example, the target angular range may include up to 30 degrees of rotation. In other examples, the target angular range may be various angular ranges depending on a configuration of the front suspension system 126, such as up to 20 degrees or up to 50 degrees. In this way, the air spring 130 may be configured in the front suspension system 126 for substantially axial compression without any guiding structure extending a length thereof.

Compression and expansion of the air spring 130 is coupled to pivoting of the first and second wishbone arms 302, 304. As shown in FIGS. 4 and 5, the first and second plates 328, 340 may be maintained substantially parallel to one another during compression and expansion of the air spring. FIG. 4 depicts a first side view 400 of the front suspension system 126 in a first, maximally expanded position, and FIG. 5 depicts a second side view 500 of the front suspension system 126 in a second, maximally compressed position. The air spring, which may be the air spring 130 of FIGS. 1 and 3, is represented as a mechanical spring 402 in FIGS. 4 and 5 so as to more clearly depict spring compression and expansion.

The first, maximally expanded position of the front suspension system 126 may be defined by a first plane (a cross-section of the first plane being indicated by a dashed line 404), coterminous with the plane of the first wishbone arm 302 (indicated by the dashed line 344) in the first position. The second, maximally compressed position of the front suspension system 126 may be defined by a second plane (a cross-section of the second plane being indicated by a dashed line 406), coterminous with the plane of the first wishbone arm 302 in the second position. The first wishbone arm 302, which may be in simultaneous pivoting motion with the second wishbone arm 304, may freely pivot between the first and second planes. Accordingly, the first and second wishbone arms 302, 304 may freely pivot within the target angular range, an upper limit of which may be defined by an angle γ between the first and second planes.

Though not explicitly depicted at FIGS. 4 and 5 (but described above with reference to FIG. 3), the respective first ends 308, 310 of the first and second wishbone arms 302, 304 may be coupled to the upright 306 and the respective second ends 312, 314 of the first and second wishbone arms 302, 304 may be coupled to the vehicle frame (e.g., 316). Accordingly, as the first and second wishbone arms 302, 304 pivot between the first and second positions, the upright 306 may move relative to the frame of the vehicle.

The air spring may be coupled at opposite ends to the upper and leveling links 322, 336, which may include the respective first and second triangular portions 326, 338 and the respective first and second plates 328, 340. As shown, the upper and leveling links 322, 336 may maintain substantially axial compression of the air spring by respectively maintaining a position of the first and second plates 328, 340. The upper link 322 may be pivotably coupled to the vehicle frame (e.g., 316), as described above with reference to FIG. 3. The leveling link 336 may also be pivotably coupled to the frame of the vehicle, the leveling link 336 extending from a coupling at the air spring and the first wishbone arm 302 to the frame of the vehicle, as further described above with reference to FIG. 3. Specifically, the leveling link 336 may include a first coupling element 350 extending from the second plate 340 to a second coupling element 352, the first and second coupling elements 350, 352 being pivotably coupled to one another. The second coupling element 352 may extend from the first coupling element 350 to a second bracket 354, the second coupling element 352 being pivotably coupled to the second bracket 354.

As shown, the second coupling element 352 may be enabled to pivot simultaneously with the first and second wishbone arms 302, 304, such that the second plate 340 may be maintained substantially parallel to the first plate 328 as the first and second wishbone arms 302, 304 pivot through the target angular range. Accordingly, the angle β between the plane of the first wishbone arm 302 and the central axis 332 may be substantially maintained as the front suspension system 126 moves from the first, maximally expanded position to the second, maximally compressed position.

Figure 7:
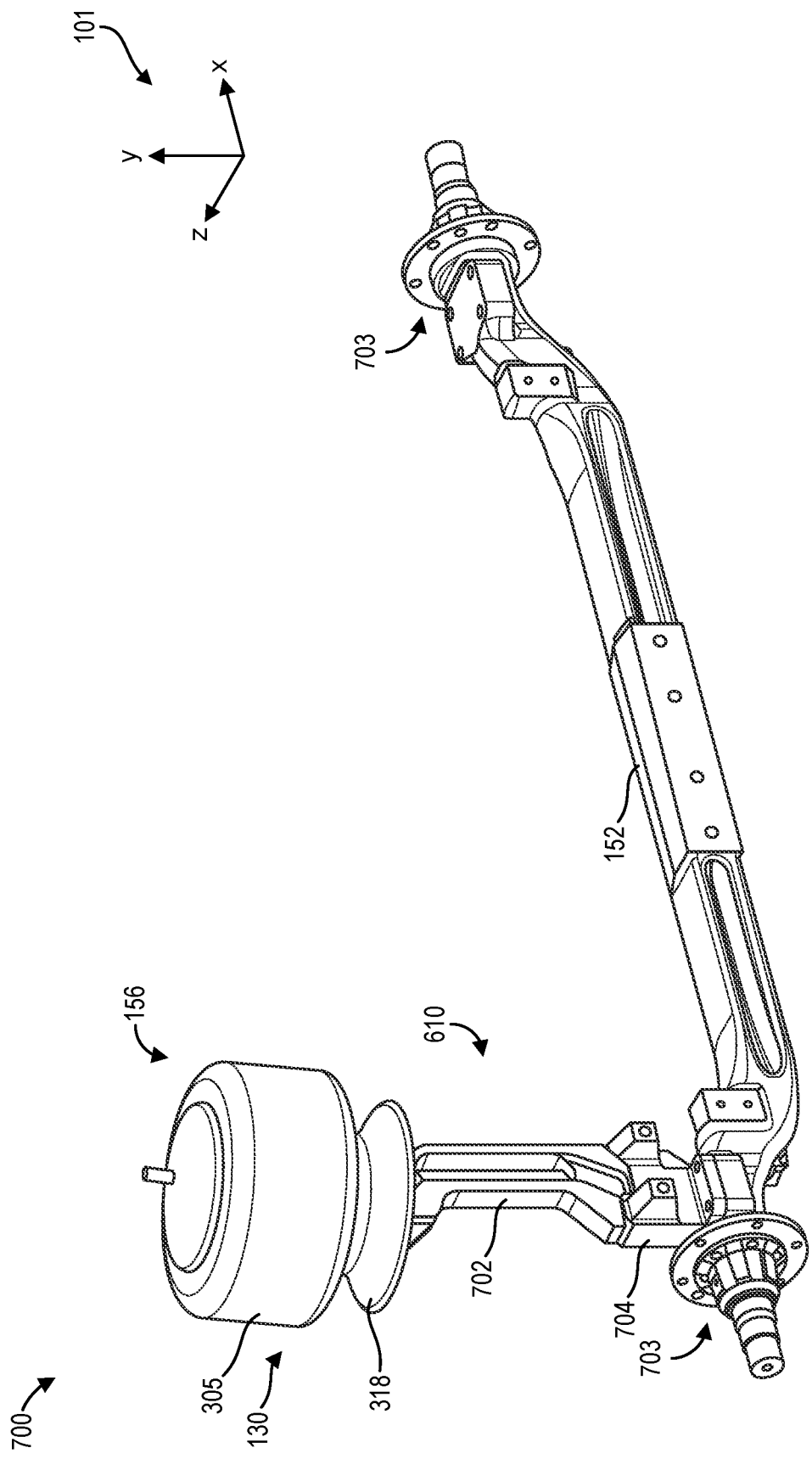
FIG. 7 shows a detailed view of the example of the rear suspension system of FIG. 6.
Figure 8:
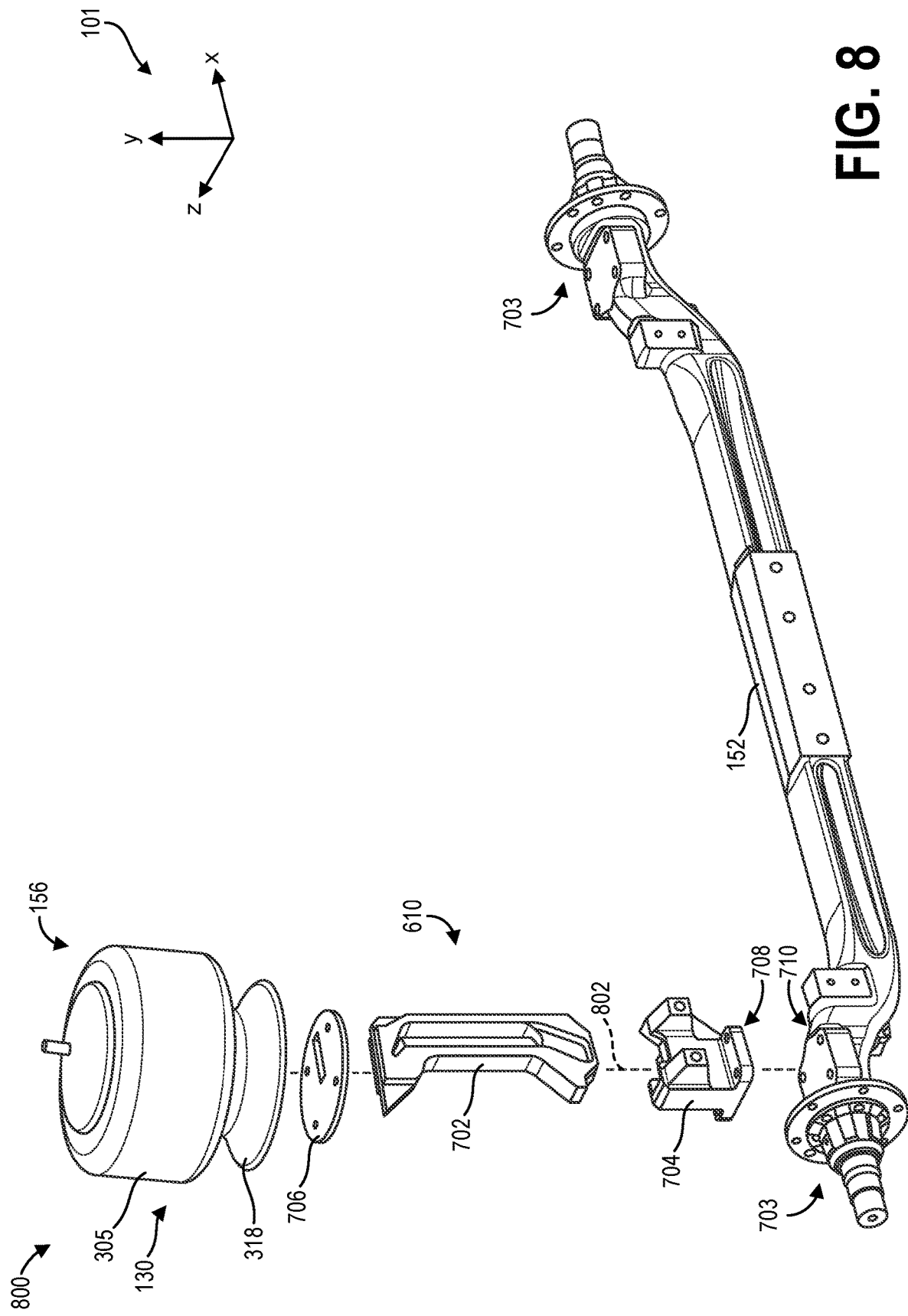
FIG. 8 shows an exploded view of the example of the rear suspension system of FIG. 6.
Figure 9:
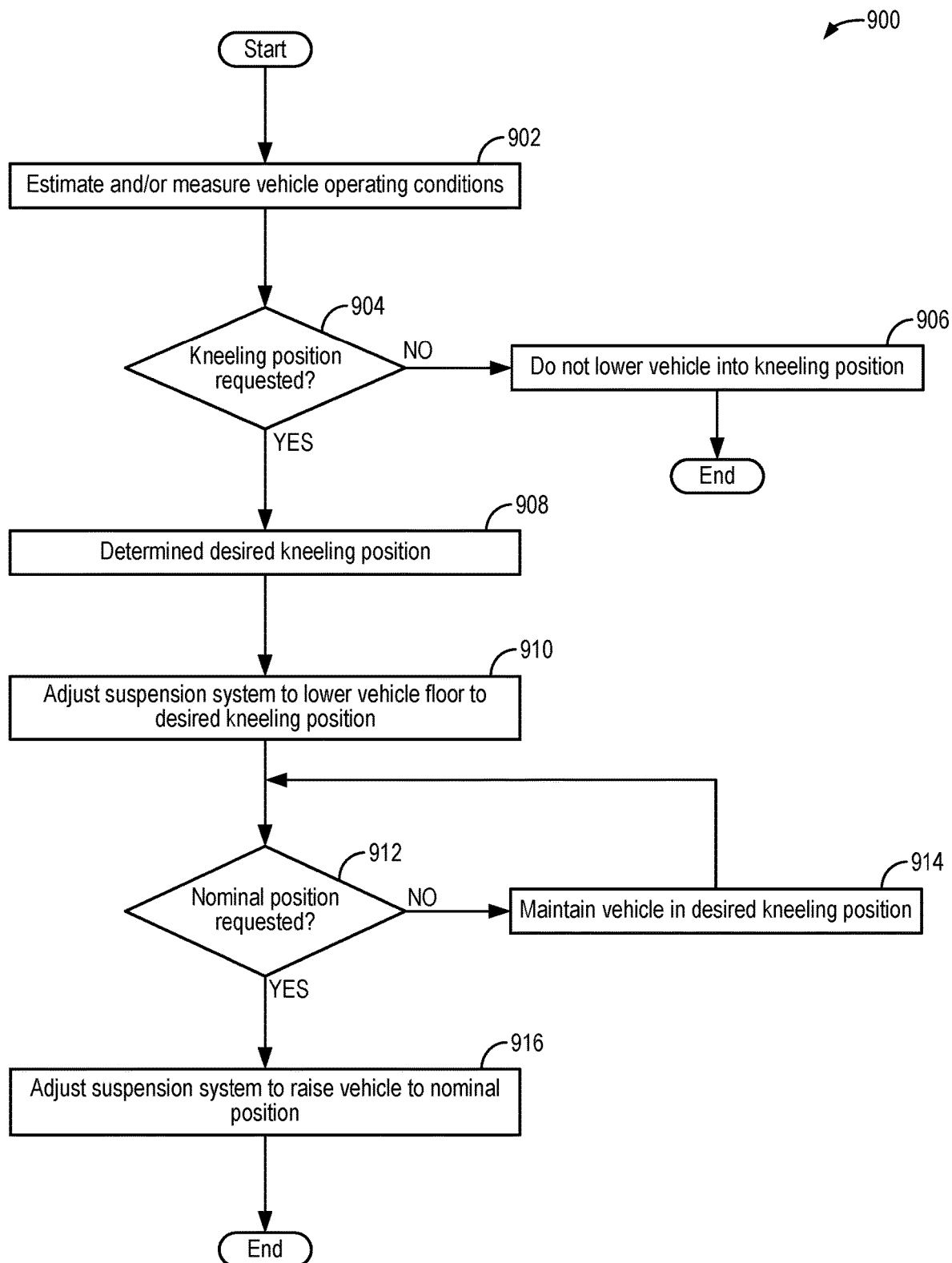
FIG. 9 shows a flowchart of an example method for lowering an electric commercial vehicle, such as the vehicle shown in FIGS. 1-2C, into a kneeling position to accommodate a user.

An air suspension system may also be provided at the rear axle 152 of the vehicle (e.g., 100), as shown in FIGS. 6-8. Accordingly, a perspective view 600 of an example of the rear suspension system 156 is shown in FIG. 6. Rear wheels 106 may be coupled to the rear axle 152, where the rear axle 152 may extend along the x-axis from an outermost rear wheel 106 on a first end 602 of the rear axle 152 to an outermost rear wheel 106 on an opposite, second end 604 of the rear axle 152. The vehicle being configured for front-wheel drive, the rear axle 152 may not be driven, and the rear wheels 106 may rotate freely about the rear axle 152. The rear axle 152 may be fixed in position relative to the vehicle, both directly coupled to the skateboard chassis (e.g., 108) of the vehicle and further coupled to the skateboard chassis via cross links 154, lateral support links 606, and transverse support links 608. In some examples, to provide additional braking torque, each of the rear wheels 106 may be provided with drum brakes.

The rear suspension system 156 may include the air spring 130 (described in further detail above with reference to FIG. 3), the air spring 130 positioned above a rear wheel hub assembly (described in further detail below with reference to FIGS. 7 and 8) with respect to the vehicle (e.g., along a positive direction of the y-axis) and substantially vertical, with respect to the y-axis. Configuring the air spring 130 in this way may permit increased lowering of the skateboard chassis (e.g., 108) relative to alternative configurations (e.g., substantially diagonal with respect to the y-axis, positioned at least partially adjacent to the rear wheels 106 along the x-axis, etc.). Further, by positioning the air spring 130 above the rear wheel hub assembly, the air spring 130 may not interfere with a desirable coupling of the rear axle 152 to the rear wheels 106. Accordingly, it will be appreciated that the air spring 130 described herein may be implemented in many types of commercial vehicles with relative ease. In this way, the generalized configuration of the present disclosure may be implemented in a commercial vehicle to facilitate loading/unloading thereof with ease of implementation and at reduced cost.

The air spring 130 may be fixedly coupled to the rear axle 152 via a link 610. Accordingly, the link 610 may extend from the air spring 130 to the rear axle 152 at an end thereof (e.g., the first end 602 or the second end 604). Specifically, and as shown in detail view 700 and exploded view 800 of FIGS. 7 and 8, respectively, the link 610 may include a first coupling element 702, a second coupling element 704, and a plate 706 vertically coupled along an axis 802 (the axis 802 being parallel to the y-axis).

As shown, the plate 706 may be attached (directly coupled) to a bottom of the stem 318 of the air spring 130 by bolting. The first coupling element 702 may extend along the axis 802 from the plate 706 to the second coupling element 704, the first coupling element 702 being fixedly (e.g., permanently) coupled to each of the plate 706 and the second coupling element 704. The second coupling element 704 may extend along the axis 802 from the first coupling element 702 to the rear axle 152, the second coupling element 704 being attached (directly coupled) to the rear axle 152 via bolting. In one example, the second coupling element 704 may be provided with a plurality of holes 708 respectively complementary to a plurality of holes 710 provided in the rear axle 152. Accordingly, the link 610 may be attached (directly coupled) to the rear axle 152 via a plurality of fasteners respectively provided in complementary pairs of holes 708 and 710.

The air spring 130 may be positioned directly above a rear wheel hub assembly 703, such that compression of the air spring 130 may permit increased lowering of the skateboard chassis (e.g., 108). Specifically, compression of the air bag 305 may be directed vertically along the axis 802 by the link 610, the link 610 being aligned with the air spring 130 to compel the stem 318 to press directly into the air bag 305. In this way, the air spring 130 may be configured in the rear suspension system 156 for substantially axial compression without any guiding structure extending a length thereof.

Overall, the front suspension system 126 and the rear suspension system 156 may be configured so that the skateboard chassis 108 may be raised and lowered relative to the ground by adjusting one or more air springs. Stated differently, the front suspension system 126 and the rear suspension system 156 may be collectively operated as an adjustable suspension system, so that the height of the skateboard chassis 108 relative to the ground may be adjusted by adjusting one or more air springs of the adjustable suspension system (e.g., the front suspension system 126 and the rear suspension system 156). For example, by adjusting an axial compression of each of the front suspension system 126 and the rear suspension system 156, the vehicle may be transitioned from the nominal position shown in FIG. 2A to a kneeling position, such as one of the first kneeling position shown in FIG. 2B and the second kneeling position shown in FIG. 2C. In some examples, the controller may select between more than two kneeling positions for the adjustable suspension system, while in other examples, the vehicle may have only one kneeling position. Lowering the skateboard chassis 108 to the kneeling position may facilitate unloading of the vehicle, and may increase ease of use by the customer, leading to an increase in customer satisfaction. Further, user safety may be preserved by decreasing an incidence of muscle strain due to lifting heavy items from a high floor. Further still, lowering the vehicle may ameliorate challenges presented by entering and exiting the vehicle cabin, as the vehicle cabin may be lowered closer to the ground in the kneeling position. Thus, using the adjustable suspension system (e.g., comprising the front suspension system 126 and the rear suspension system 156), the skateboard chassis 108 may be raised and lowered, such as by adjusting an amount of air in the air springs. In some examples, the vehicle may move at a low speed in order to increase ground clearance.

Therefore, FIG. 9 shows a flowchart of an example method 900 for raising and lowering (e.g., kneeling) a vehicle with a skateboard frame (e.g., such as vehicle 100 shown in FIGS. 1-2C) via an adjustable suspension system (e.g., such as front suspension system 126 and rear suspension system 156 of FIG. 1). Method 900 will be described with respect to the vehicle configuration shown in FIGS. 1-2C and the suspension system shown in FIGS. 1-8, although method 900 may be applied in other systems that include a skateboard frame chassis and an adjustable suspension system. Instructions for carrying out method 900 may be executed by a controller, such as controller 150 of FIG. 1, based on instructions stored on a memory of the controller and in conjunction with signals received from sensors of the vehicle system, such as the sensors described with reference to FIG. 1. The controller may employ actuators of the vehicle system to adjust vehicle operation according to the methods described below, such as by adjusting the adjustable suspension system in order to lower and raise a skateboard chassis of the vehicle.

At step 902, method 900 includes estimating and/or measuring vehicle operating conditions. The operating conditions may include, for example, vehicle speed, engine status (e.g., whether the engine is on), whether the vehicle is parked, and whether a user is in the vehicle. The operating conditions may further include one or more of a proximity of a user and a proximity of a key fob. The operating conditions may be measured by one or more sensors communicatively coupled to the controller, or may be inferred based on available data.

At step 904, method 900 includes determining whether a kneeling position is requested. In particular, step 904 includes determine whether to lower the vehicle floor to a kneeling position in order to accommodate a user while the vehicle is stopped and/or in response to a request to stop the vehicle, and possibly even while coming to a stop with speed below a threshold. A request to lower the vehicle to a kneeling position may be enabled when the vehicle is stopped and/or when the vehicle speed is below the threshold and the vehicle is decelerating toward stop. For example, when the vehicle is moving (e.g., not stopped or parked or moving faster than the speed threshold), the kneeling position may not be requested and/or may not be enabled. When the vehicle is stopped (e.g., the engine is off and/or the vehicle is parked), the kneeling position may be requested based on one or more sensor inputs indicative of a request for the kneeling position. Specifically, the vehicle may be lowered when the controller determines that a user will be exiting the vehicle and/or unloading objects, which may be facilitated by the kneeling position. As another example, the vehicle may be lowered when the controller determines that a user will be re-entering the vehicle. For example, the sensor inputs may include a user input, such as one of a voice command, a button press, and a gesture. As another example, the sensor inputs may include a proximity and/or motion sensor (e.g., such as proximity and motion sensor 180 of FIG. 1), a GPS signal, a signal from a key fob, a camera feed, and the like.

In some examples the vehicle may be lowered and raised based on one input, or a combination of inputs. For example, a user may provide an input corresponding with a request to lower the vehicle to the kneeling position. As a first example, the user may directly control the height of the skateboard chassis via an input device, such as a button in the vehicle cabin, a button on a key fob, a voice command, a gesture, and an input to an application on a mobile device. For example, the user input may be a user input, such as one of a voice command and a gesture. As an example, the vehicle includes a motion sensor, and the user input is a gesture (e.g., such as moving a hand or a foot) near the motion sensor. Further, in some examples, the controller may automatically determine to raise and/or lower the skateboard chassis based on one or more sensor inputs, such as a proximity sensor monitoring a position of the user, a motion sensor detecting a user gesture, a key fob proximity to the vehicle, a camera feed from one or more cameras mounted to the vehicle, and the like. As an example, the controller may rely on a combination of inputs. For example, if the controller determines that the key fob is within a pre-determined distance of the vehicle, and the motion sensor detects movement, the vehicle may lower into the kneeling position. Further, the controller may apply machine learning techniques in order to predict a desired vehicle height across a range of operating conditions. For example, the controller may apply machine learning techniques to determine a first set of geographic locations where a user may request the vehicle to lower into a kneeling position upon stopping the vehicle and/or decelerating to the stop, and a second set of geographic locations where the user may not be able to request the vehicle to lower into a kneeling position, even upon stopping the vehicle. As another example, the controller may analyze a camera feed from one or more cameras mounted to the vehicle, and may determine when to raise and lower the vehicle based on the camera feed. In some examples, the vehicle may kneel before the user exits the vehicle. For example, the vehicle may kneel in order to lower the skateboard chassis before the user exits, which may increase user safety while exiting the vehicle. In other examples, the vehicle may kneel when the user determines to unload the vehicle. For example, the user may exit the vehicle, and the vehicle may then kneel for unloading.

If method 900 determines that the kneeling position is not requested at 904, method 900 continues to step 906, and includes not lowering the vehicle to a kneeling position. For example, the controller may not adjust the adjustable suspension system in order to lower the skateboard chassis to a kneeling position, and may instead maintain the vehicle in the nominal position. Method 900 may then end.

If method 900 determines that the kneeling position is requested at 904, method 900 continues to step 908, and includes determining a desired kneeling position. For example, as elaborated above with respect to FIGS. 2A-2C, the vehicle may be configured to have more than one kneeling position. As an example, a first kneeling position may be selected when the user is preparing the exit the vehicle, and a second kneeling position may be selected when the user is preparing to unload the vehicle. As another example, a user may input a command including which of the two kneeling positions to select. In another example, the adjustable suspension system may be configured only for one kneeling position. In yet another example, the controller may select a kneeling height for the vehicle based on machine learning techniques.

At step 910, method 900 includes adjusting the suspension system of the vehicle to lower the vehicle floor to the desired kneeling position (e.g., the desired kneeling position determined at step 908). For example, the controller may adjust an amount of air in one or more air springs of the adjustable suspension system in order to adjust the height of the skateboard chassis relative to the ground. In particular, an amount of axial compression in each of a front suspension system and a rear suspension system (e.g., such as front suspension system 126 and rear suspension system 156 of FIG. 1) may be decreased so that the skateboard chassis is lowered.

At step 912, method 900 includes determining whether the nominal position is requested. For example, the controller may determine whether returning the vehicle floor to the nominal height (e.g., leaving the kneeling position) is requested. As one example, the vehicle may be raised when the controller determines that vehicle operation may resume (e.g., the user may begin driving the vehicle). For example, based on a sensed key fob proximity, the controller may determine to raise the vehicle to the nominal position. As another example, the controller may determine to raise the vehicle to the nominal position based on an input from the user, such as a user input to an input device in the vehicle cabin. In other examples, the controller may determine to return the vehicle floor to the nominal height based on one or more of a voice command, a gesture, a key fob proximity, and sensing a vehicle key in an ignition. As an example, after the user finishes unloading objects from the vehicle, the user may provide a hands-free input (e.g., such as one of a voice command, a gesture, and a key fob proximity), in order to signal that the nominal position is requested.

If method 900 determines that the nominal position is not requested at step 912, method 900 continues to 914 and includes maintaining the vehicle in the desired kneeling position. For example, the controller may continue to maintain the adjustable suspension system in the desired kneeling position in order to facilitate user activities, such as unloading the vehicle. Method 900 may return to 912.

If method 900 determines instead that the nominal position is requested at step 912, method 900 continues to 916 and includes adjusting the suspension system to raise the vehicle to the nominal position. For example, controller may adjust the adjustable suspension system to raise the skateboard chassis to the nominal position. As an example, the controller may adjust an amount of air in one or more air springs of the adjustable suspension system, which may raise the skateboard chassis relative to the ground. For example, the nominal position may be configured so that the skateboard chassis is high enough off the ground for driving and other vehicle operation. Method 900 may then end.

Further, in some examples, a vehicle with a skateboard chassis may be transitioned between a plurality of positions, such as a kneeling position, where the skateboard chassis is at a minimum height, a static position, where the skateboard chassis is at a nominal height for vehicle operation, and a maximum position, where the skateboard chassis is at a maximum height for vehicle operation. Therefore, FIGS. 10A-10G shows a flowchart of an example method 1000 for raising and lowering (e.g., kneeling) a vehicle with a skateboard frame (e.g., such as vehicle 100 shown in FIGS. 1-2C) via an adjustable suspension system (e.g., such as front suspension system 126 and rear suspension system 156 of FIG. 1). In particular, method 1000 includes transitioning the vehicle with the skateboard frame between the kneeling position, the static position, and the maximum position. Method 1000 will be described with respect to the vehicle configuration shown in FIGS. 1-2C and the suspension system shown in FIGS. 1-8, although method 1000 may be applied in other systems that include a skateboard frame chassis and an adjustable suspension system. Instructions for carrying out method 1000 may be executed by a controller, such as controller 150 of FIG. 1, based on instructions stored on a memory of the controller and in conjunction with signals received from sensors of the vehicle system, such as the sensors described with reference to FIG. 1. For example, method 1000 may run continuously. The controller may employ actuators of the vehicle system to adjust vehicle operation according to the methods described below, such as by adjusting the adjustable suspension system in order to lower and raise a skateboard chassis of the vehicle.

Figure 10A:
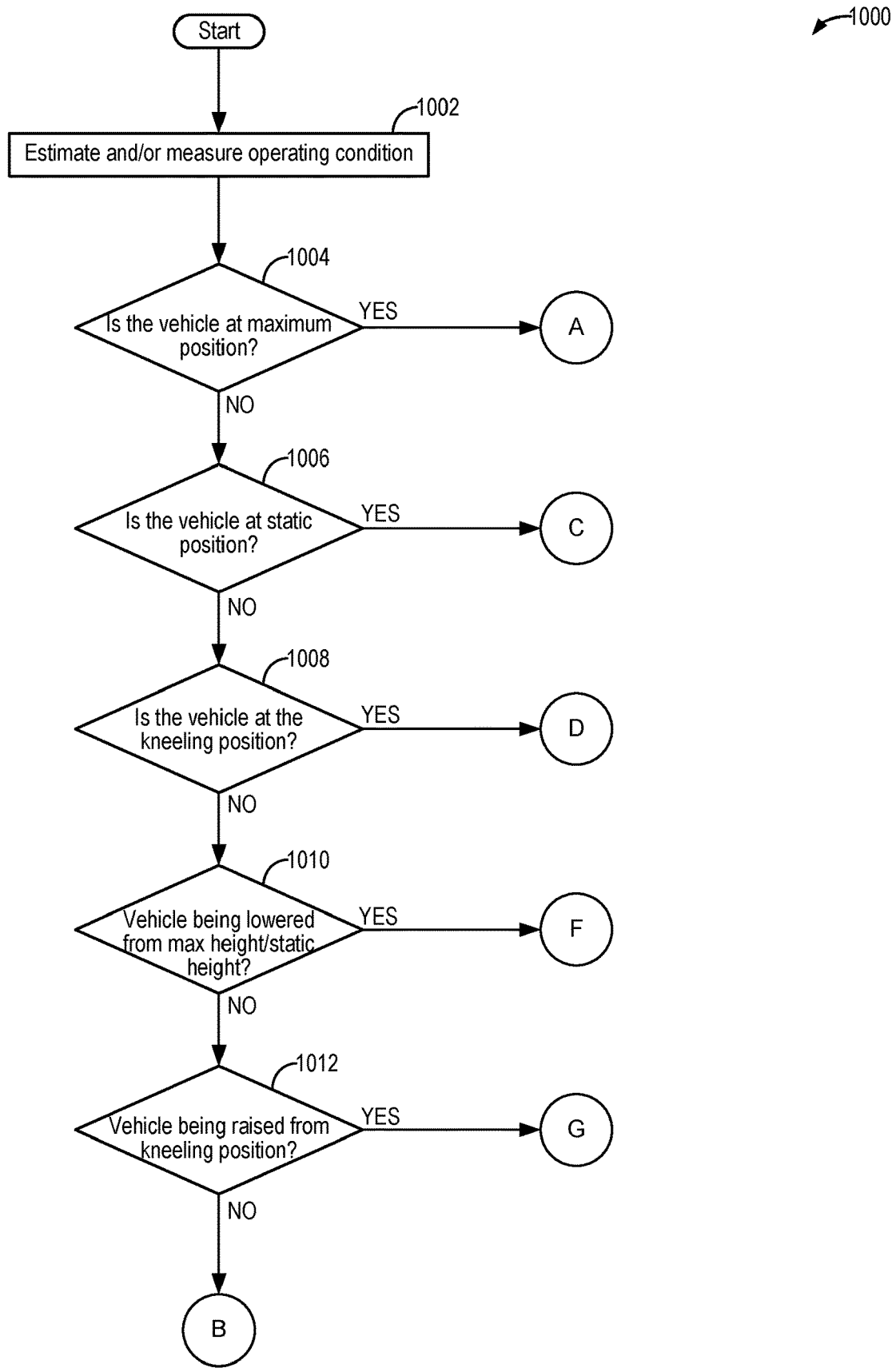
FIG. 10A-10G shows a flowchart of an example method for transitioning an electric commercial vehicle, such as the vehicle shown in FIGS. 1-2C between a kneeling position, a static position, and a maximum height position to accommodate a user.

Turning first to FIG. 10A, at step 1002, method 1000 includes estimating and/or measuring an operating condition. For example, at 1002, the controller may determine a state of the suspension system, a vehicle speed, whether the vehicle is parked, a proximity of a user, a position of one or more doors, an amount of vehicle load, and a proximity of a key fob. Further, the controller may monitor sensor data from other sensors, such as motion sensors, proximity sensors, cameras, GPS sensors, and the like. The operating conditions may be measured by one or more sensors communicatively coupled to the controller, or may be inferred based on available data.

At step 1004, method 1000 includes determining whether the vehicle is at a maximum position. For example, the suspension system may be at a maximum height when the suspension system is raised to a maximum height for the suspension system.

Figure 10B:
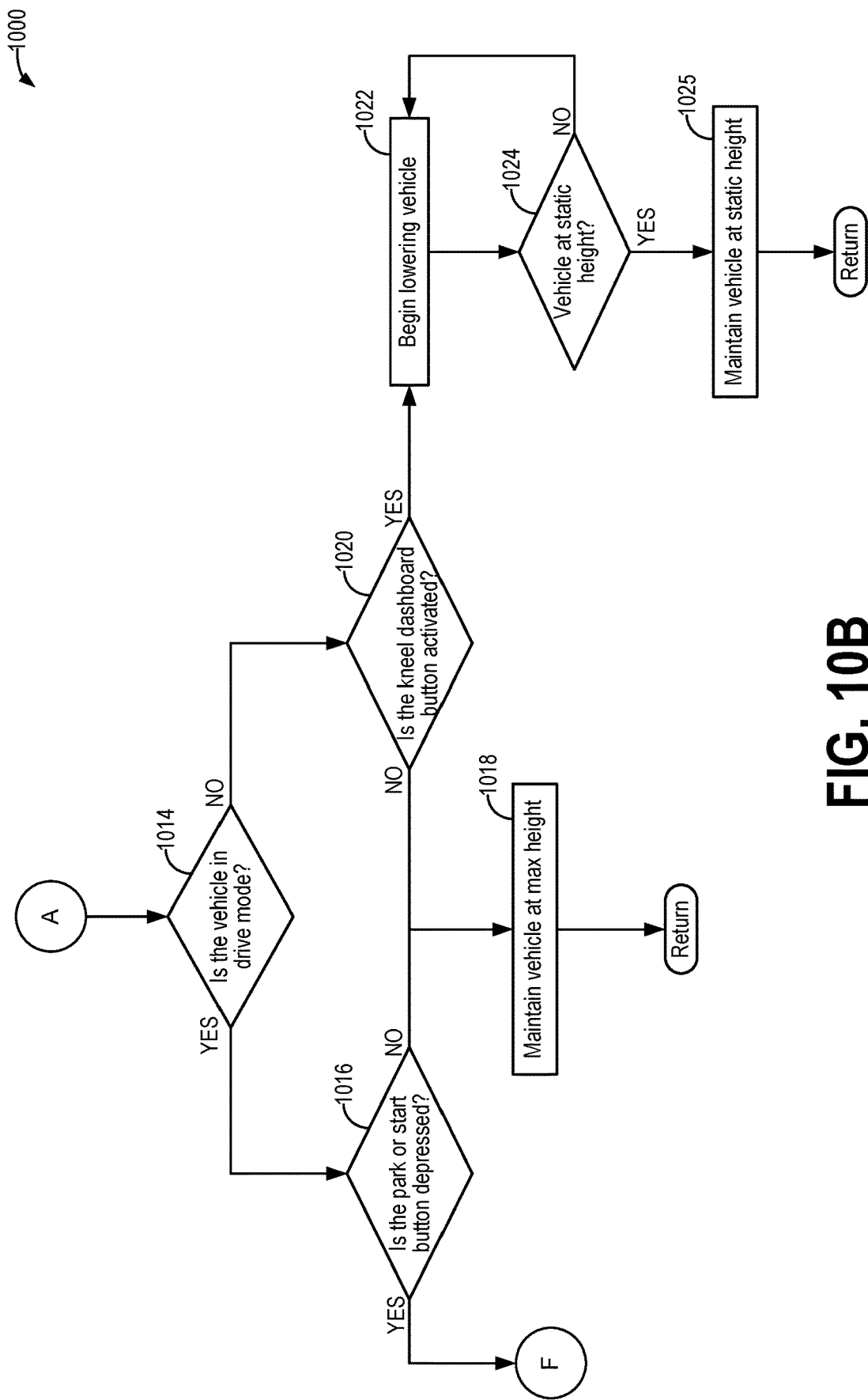

If method 1000 determines that the vehicle is at the maximum position at 1004, method 1000 continues to A, and includes continuing to step 1014 (see FIG. 10B).

If method 1000 determines that the vehicle is not at the maximum position at 1004, method 1000 continues to 1006, and includes determining whether the vehicle is at the static position. For example, the static position may be at the static height when the suspension system is at a neutral height, such as a neutral height selected for driving the vehicle. The static position may be lower (e.g., closer to the ground) relative to the maximum position.

Figure 10C:
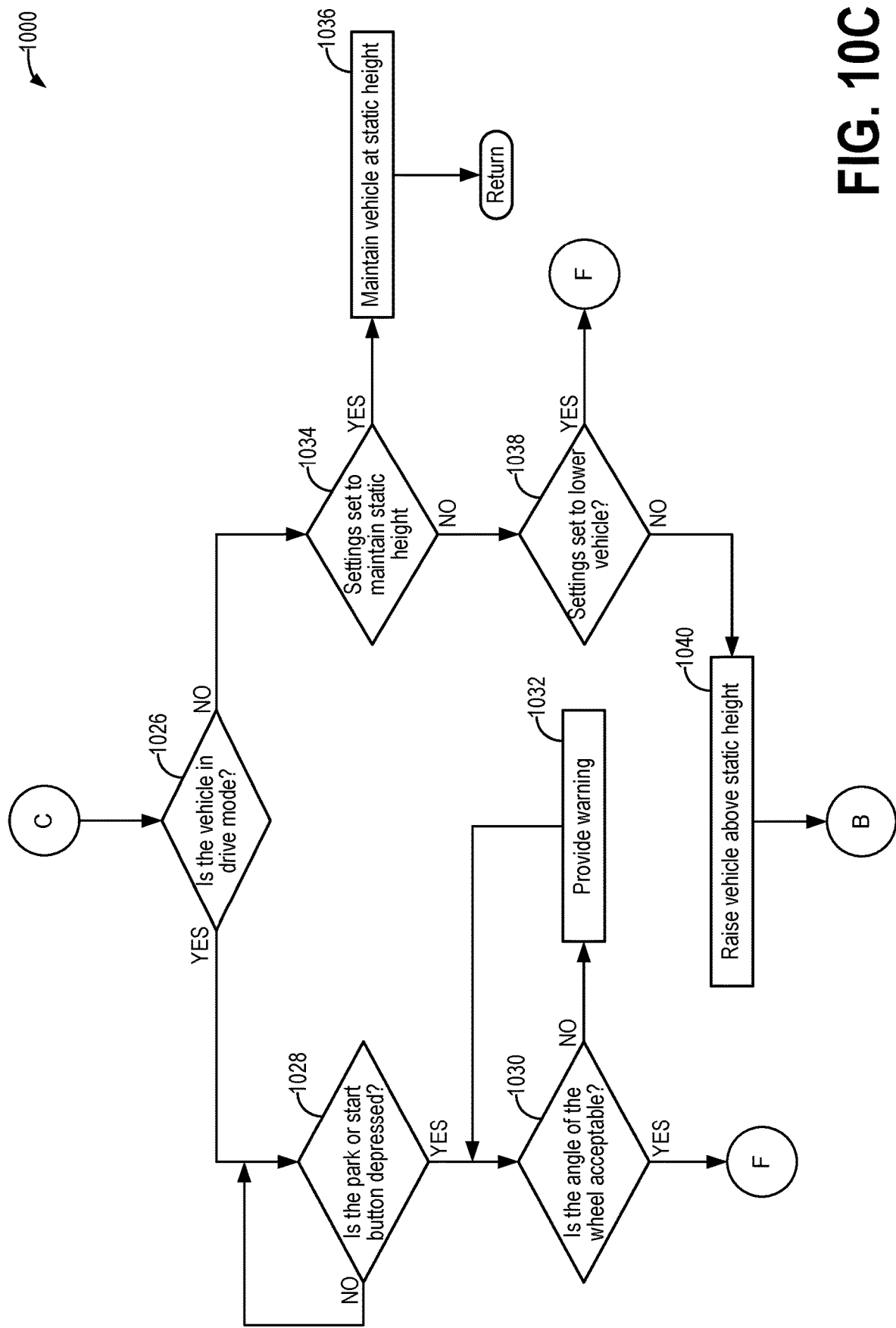

If method 1000 determines that the vehicle is at the static position at step 1006, method 1000 continues to C and includes step 1026 (see FIG. 10C).

If method 1000 determines that the vehicle is not at the static position at step 1006, method 1000 continues to step 1008 and includes determining whether the vehicle is in the kneeling position. For example, the method may determine whether the vehicle is lowered in a kneeling position. For example, the kneeling position may be a position lower relative to the static position, and may be selected to facilitate loading and unloading.

Figure 10D:
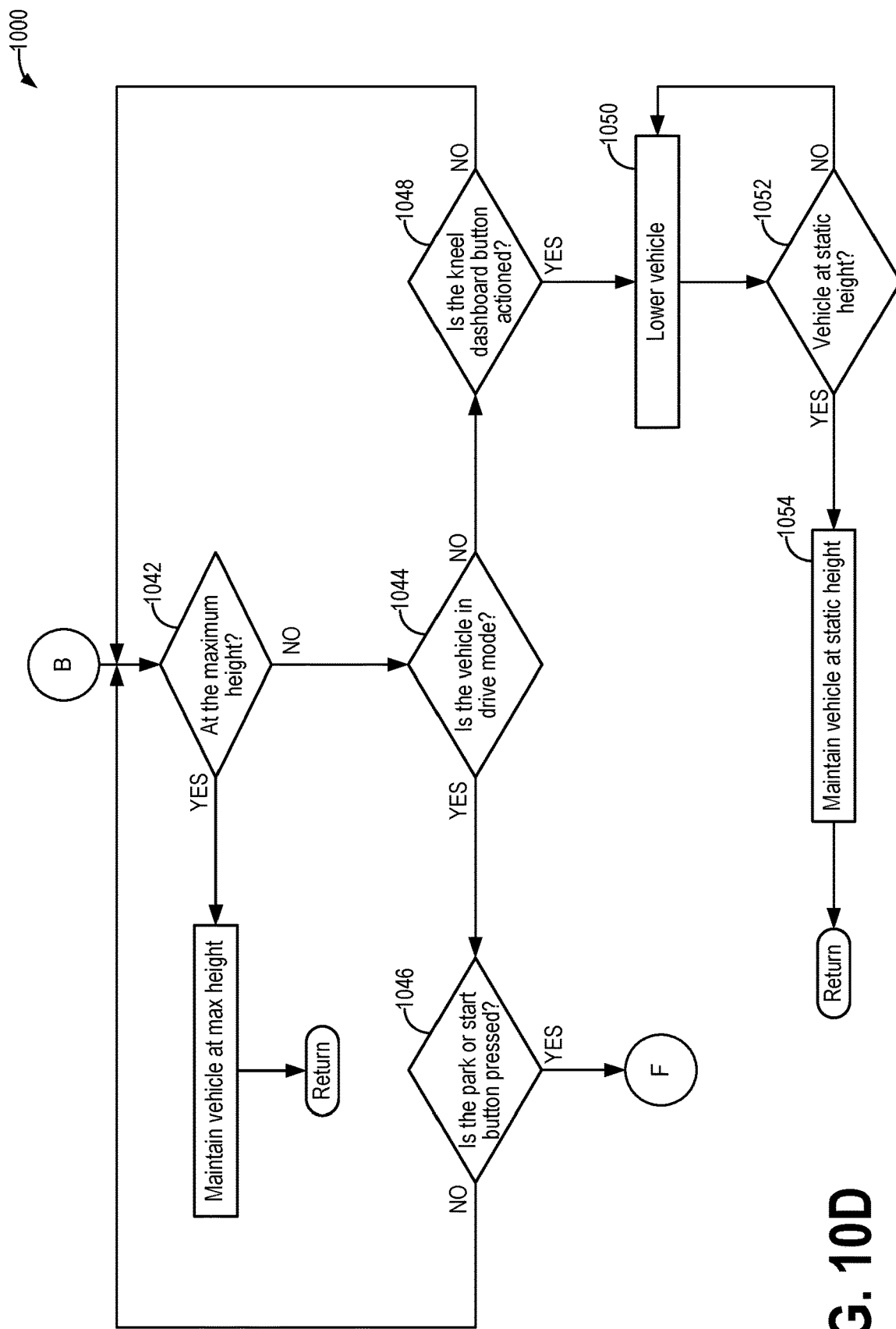
Figure 10E:
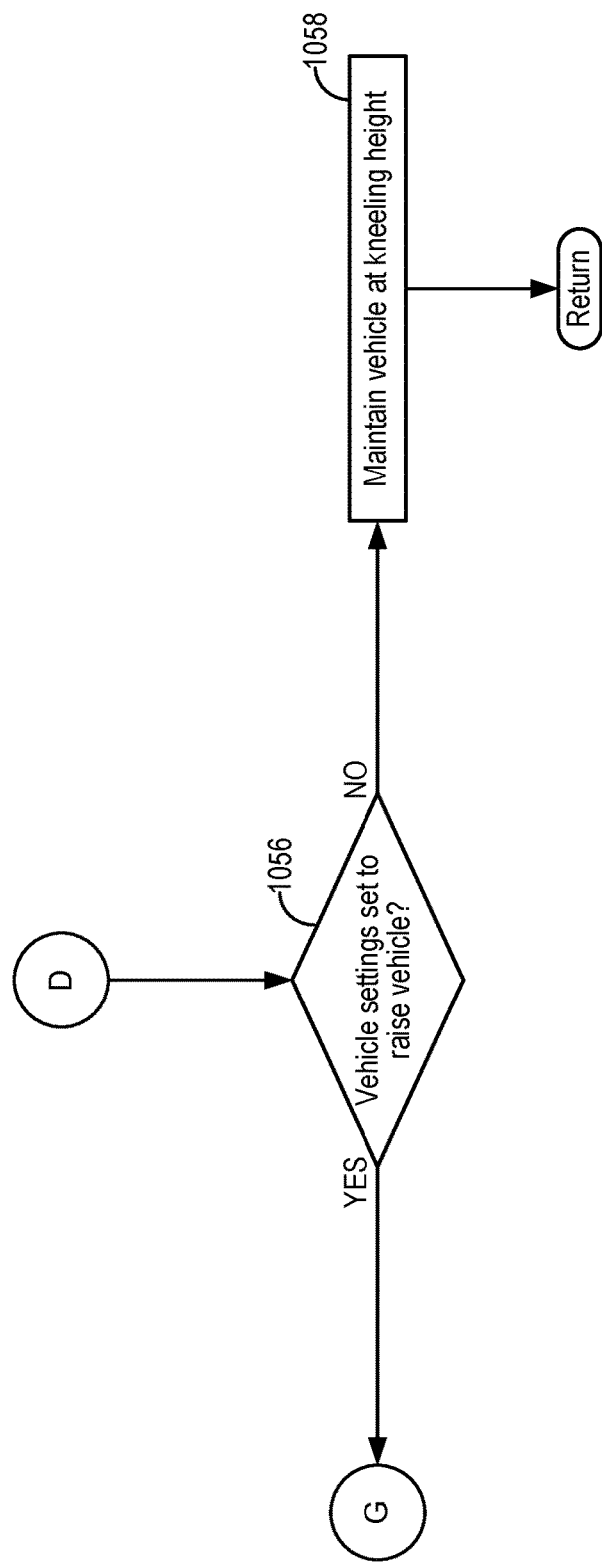

If method 1000 determines that the vehicle is in the kneeling position at step 1008, method 1000 continues to D and includes step 1056 (see FIG. 10E).

If method 1000 determines that the vehicle is not at the kneeling position at step 1008, method 1000 continues to step 1010 and includes determining whether the vehicle is being lowered from the maximum height or the static height. As a first example, the controller may determine that the vehicle is being lowered from the maximum height or the static height if the vehicle is being lowered from the maximum height to a lower height relative to the maximum height. As a second example, the controller may determine that the vehicle is being lowered from the static height to a lower height relative to the static height. For example, the controller will determine whether the adjustable suspension system may be adjusted continuously in order to lower the vehicle height.

Figure 10F:
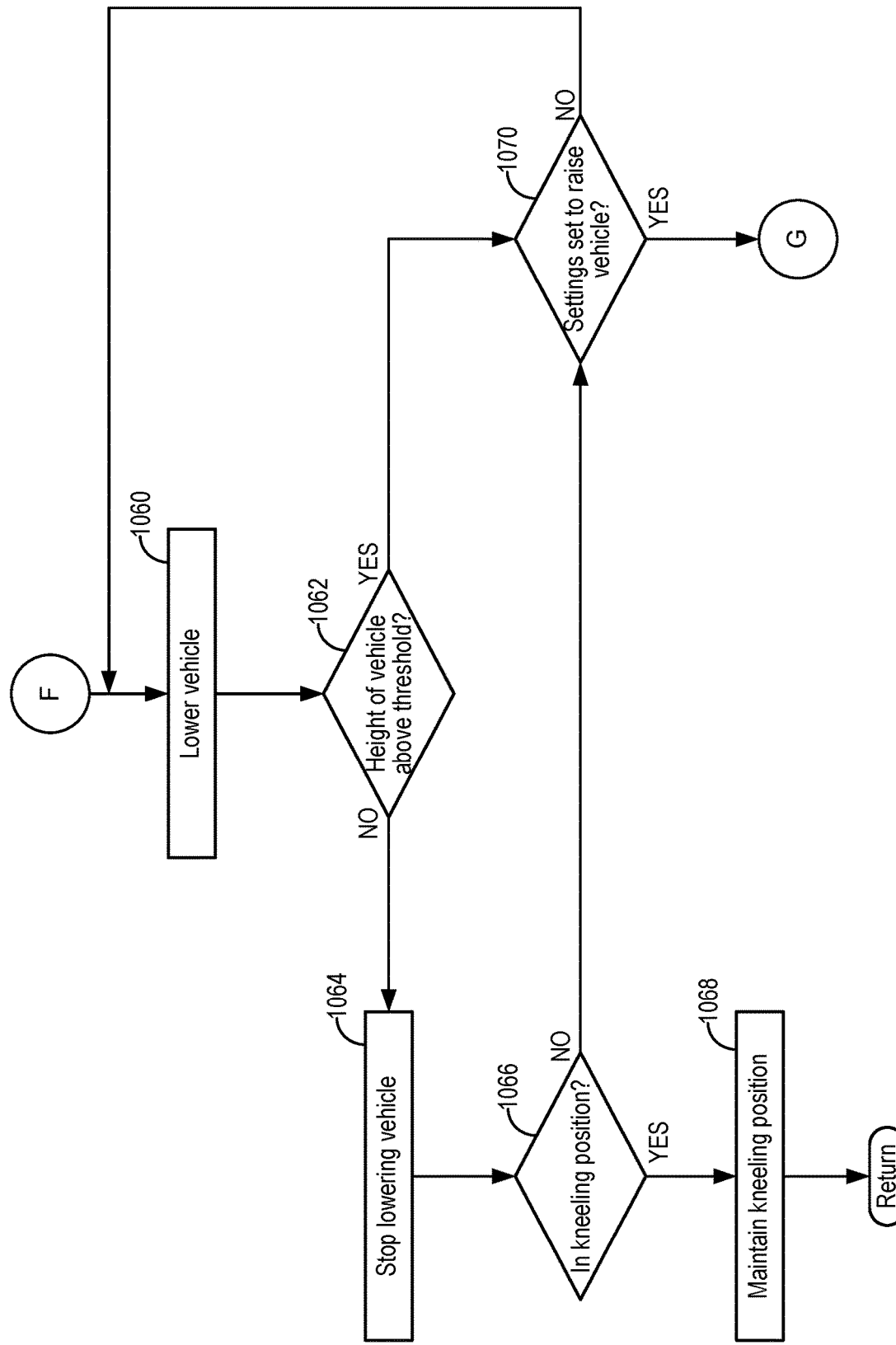

If method 1000 determines that the vehicle is being lowered from the maximum height or the static height, method 1000 continues to F and includes step 1060 (see FIG. 10F).

If method 1000 determines that the vehicle is not being lowered from maximum height or the static height at step 1010, method 1000 continues to step 1012 and includes determining whether the vehicle is being raised from the kneeling position. For example, the controller may determine whether the adjusted suspension system may be adjusted continuously in order to raise the vehicle height from the kneeling position.

Figure 10G:
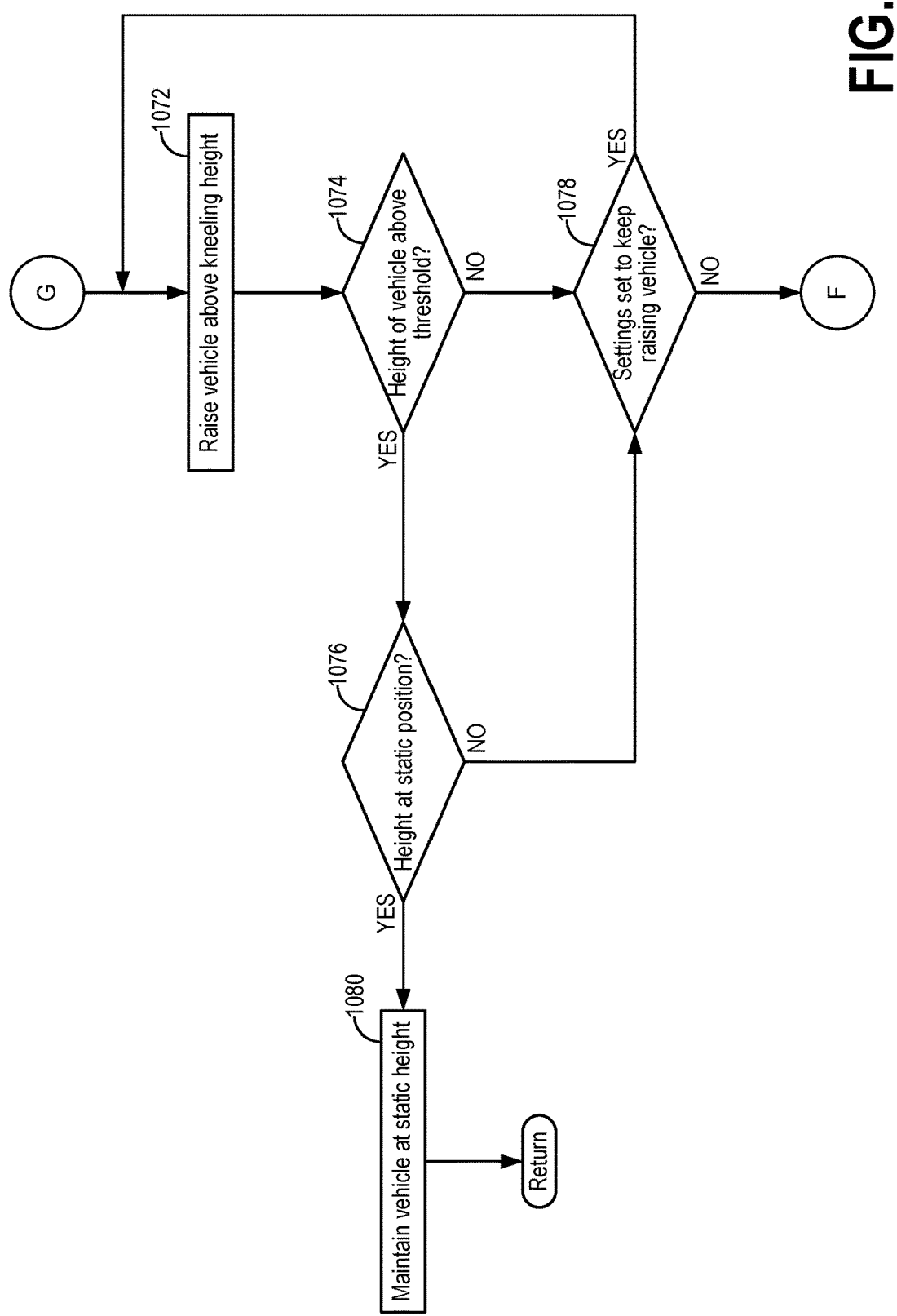

If method 1000 determines that the vehicle is being raised from the kneeling position at step 1012, method 1000 continues to G and includes step 1072 (see FIG. 10G).

If method 1000 determines that the vehicle is not being raised from the kneeling position at step 1012, method 1000 may determine that the vehicle is being raised from the static height to a higher position, and continues to B, including step 1042 (see FIG. 10D).

Turning next to FIG. 10B, A includes step 1014. At step 1014, method 1000 includes determining whether the vehicle is in a drive mode. For example, based on at least one of a state of the vehicle engine, a battery status, and a key position, the controller may determine whether the vehicle is in the drive mode. For example, if the key is turned to an "engine on" position and the vehicle is in a "drive" gear, the controller may determine that the vehicle is in the drive mode. As another example, if the controller determines that the vehicle is parked, the controller may determine that the vehicle is not in the drive mode.

If the controller determines that the vehicle is in the drive mode at step 1014, method 1000 continues to 1016 and includes determining whether one or both of the park button and the start button are depressed. For example, each of the park button and the start button may transmit a signal to the controller. Based on the signal from each of the park button and the start button, method 1000 may determine whether one or both of the park button and the start button are depressed.

If method 1000 determines that one or both of the park button and the start button are depressed at step 1016, method 1000 continues to F and includes continuing to step 1060 (see FIG. 10F).

If method 1000 determines that one or both of the park button and the start button are depressed at step 1016, method 1000 continues to step 1018 and includes maintaining the vehicle at the maximum height (e.g., in the maximum position). For example, the vehicle may not adjust the adjustable suspension system. Method 1000 may then return.

If method 1000 instead determines that the vehicle is not in drive mode at step 1014, method 1000 continues to step 1020 and includes determining whether a "kneel" dashboard button is activated. For example, the "kneel" dashboard button may be a button in the vehicle interior, and a user may depress the button in order to request the vehicle kneel. For example, the state of the "kneel" dashboard button may be transmitted to the controller via a signal.

If method 1000 determines that the "kneel" dashboard button is not activated at step 1020, method 1000 continues to 1018 and includes maintaining the vehicle at the maximum height. Method 1000 may then return.

If method 1000 determines instead that the "kneel" dashboard button is activated at step 1020, method 1000 continues to step 1022 and includes beginning to lower the vehicle. For example, the controller may adjust the adjustable suspension system so that the height of the skateboard chassis is lowered relative to the ground.

At step 1024, method 1000 includes determining whether the vehicle is at the static height (e.g., in the static position). For example, the static height is higher relative to the kneeling position. For example, the controller may monitor the state of the adjustable suspension system to determine whether the vehicle is at the static height.

If method 1000 determines that the vehicle is not at the static height (e.g., the vehicle is below the static height), method 1000 returns to 1022 and includes continuing the lower the vehicle.

If method 1000 determines that the vehicle is at the static height (e.g., the vehicle is in the static position), method 1000 continues to step 1025 and includes maintaining the vehicle at the static height. For example, the controller may not adjust the adjustable suspension system to raise or lower the skateboard chassis with respect to the static height. Method 1000 may then return.

Turning next to FIG. 10C, at step 1026, method 1000 includes determining whether the vehicle is in drive mode.

If method 1000 determines that the vehicle is in drive mode at step 1026, method 1000 continues to step 1028 and includes determining whether one or both of the park button and the start button is depressed.

If method 1000 determines that one or both of the park button and the start button is not depressed at step 1028, method 1000 returns to step 1028.

If method 1000 instead determines that one or both of the park button and the start button is depressed at step 1028, method 1000 continues to step 1030, method 1000 includes determining whether the angle of the wheel is acceptable. For example, the controller may determine whether the angle of the wheel is within a pre-determine range of wheel angles.

If method 1000 determines that the angle of the wheel is not within the range of acceptable wheel angles, method 1030 continues to 1032 and includes providing a warning message to a user. As an example, the controller may transmit a signal to illuminate a warning light on a dashboard of the vehicle. As another example, the controller may transmit a signal to play a warning sound in the cabin of the vehicle. Method 1000 may then return to step 1030.

If method 1000 determines that the angle of the wheel is within the range of acceptable wheel angles, method 1000 continues to F and includes step 1060 (see FIG. 10F).

If method 1000 determines that the vehicle is not in drive mode at step 1026, method 1000 continues to step 1034 and includes determining whether the vehicle settings are set to maintain the static height. For example, the controller may determine whether the vehicle settings are set to maintain the static height based on the kneel dashboard button and one or more door sensors.

If method 1000 determines that the vehicle settings are set to maintain the static height at step 1034, method 1000 continues to step 1036 and includes maintaining the vehicle at the static height. Method 1000 may then return.

If method 1000 determines that the vehicle settings are not set to maintain the static height at step 1034 (e.g., vehicle settings are set to adjust the vehicle height from the static height), method 1000 continues to step 1038 and includes determining whether the vehicle settings are set to lower the vehicle.

If method 1000 determines that the vehicle settings are set to lower the vehicle relative to the static position at step 1038, method 1000 continues to F and includes step 1060 (see FIG. 10F).

If method 1000 determines that the vehicle settings are not set to lower the vehicle (e.g., the vehicle settings are set to raise the vehicle relative to the static position) at step 1038, method 1000 continues to step 1040 and includes raising the vehicle above the static height. For example, the controller may adjust the adjustable suspension system to increase the height of the skateboard chassis relative to the ground. Method 1000 may then continue to B and includes step 1042 (see FIG. 10D).

Turning next to FIG. 10D, at B, method 1000 includes step 1042. At step 1042, method 1000 includes determining whether the vehicle is at the maximum height. For example, the maximum height may be the position of the skateboard chassis in the maximum position.

If method 1000 determines that the vehicle is at the maximum height, method 1000 continues to A and includes step 1014 (see FIG. 10B).

If method 1000 determines that the vehicle is not at the maximum height, method 1000 continues to step 1044 and includes determining whether the vehicle is in the drive mode.

If method 1000 determines that the vehicle is in the drive mode at step 1044, method 1000 continues to step 1046 and includes determining whether one or both of the park button and the start button are depressed.

If method 1000 determines at step 1046 that one or both of the park button and the start button are depressed, method 1000 continues to F and includes step 1060 (see FIG. 10F).

If method 1000 determines at step 1046 that one or both of the park button and the start button are not depressed, method 1000 returns to step 1042.

If method 1000 determines at step 1044 that the vehicle is not in the drive mode, method 1000 continues to step 1048 and includes determining whether the kneel dashboard button is depressed.

If method 1000 determines at step 1048 that the kneel dashboard button is not actioned, method 1000 returns to step 1042.

If method 1000 determines at step 1048 that the kneel dashboard button is actioned, method 1000 continues to step 1050 and includes lowering the vehicle. For example, the controller may adjust the adjustable suspension system in order to lower the height of the skateboard frame relative to the ground.

At step 1052, method 1000 includes determining whether the vehicle is at the static height.

If the controller determines that the vehicle is not at the static height at step 1052, method 1000 returns to step 1050 and includes continuing to lower the vehicle.

If the controller determines that the vehicle is at the static height at step 1052, method 1000 continues to step 1054 and includes maintaining the vehicle at the static height. Method 1000 may then return.

Turning next to FIG. 10E, at D method 1000 includes determining whether the vehicle settings are set to raise the vehicle at step 1056.

If the controller determines that the vehicle settings are set to raise the vehicle at step 1056, method 1000 continues to G, which includes step 1072 (see FIG. 10G).

If the controller instead determines that the vehicle settings are set to raise the vehicle at step 1056, method 1000 continues to step 1058 and includes maintaining the vehicle at the kneeling height (e.g., kneeling position). Method 1000 may then return.

Turning next to FIG. 10F, at F, method 1000 includes step 1060. At step 1060, method 1000 includes lowering the vehicle relative to the ground. For example, the controller may adjust the adjustable suspension system in order to lower the vehicle.

At step 1062, method 1000 includes determining whether the vehicle height is above a threshold vehicle height. For example, the threshold vehicle height may be a pre-determined lower threshold for the vehicle height. In particular, the lower threshold for vehicle height may be determined based on vehicle operating conditions.

If the controller determines that the height of the vehicle is not above the threshold at step 1062, method 1000 continues to step 1064, and includes not continuing to lower the vehicle.

At step 1066, method 1000 includes determining whether the vehicle is in a lowered position. For example, the controller may determine a state of the adjustable suspension system to determine whether the vehicle is in the lowered position.

If method 1000 determines that the vehicle is in the kneeling position at step 1066, method 1000 continues to step 1068 and includes maintaining the vehicle in the kneeling position. Method 1000 may then return.

If method 1000 instead determines that the vehicle is not in the kneeling position at step 1066 (e.g., the vehicle is higher than the kneeling position), method 1000 continues to step 1070 and includes determining whether the vehicle settings are set to raise the vehicle.

If method 1000 determines that the vehicle settings are set to raise the vehicle at step 1070, method 1000 continues to G and includes step 1072 (see FIG. 10G).

If method 1000 determines that the vehicle settings are not set to raise the vehicle at step 1070, method 1000 returns to step 1060 and includes continuing to lower the vehicle.

If the controller determines that the height of the vehicle is above the threshold at step 1062, method 1000 continues to step 1070, and includes determining whether the vehicle settings are set to raise the vehicle.

If method 1000 determines that the vehicle settings are set to raise the vehicle at step 1070, method 1000 continues to G and includes step 1072 (see FIG. 10G).

If method 1000 determines that the vehicle settings are not set to raise the vehicle at step 1070, method 1000 returns to step 1060 and includes continuing to lower the vehicle.

Turning next to FIG. 10G, method 1000 includes step 1072. At step 1072, method 1000 includes raising the vehicle above the kneeling height (e.g., the kneeling position). For example, the controller may adjust the adjustable suspension system in order to raise the vehicle relative to the kneeling height.

At step 1074, method 1000 includes determining whether the height of the vehicle is above a threshold height.

If the controller determines that the height of the vehicle is not above the threshold height at step 1074, method 1000 continues to step 1078 and includes determining whether the vehicle settings are set to continue raising the vehicle.

If the controller determines that the vehicle settings are set to keep raising the vehicle at step 1078, method 1000 returns to step 1072 and includes continuing to raise the vehicle relative to the kneeling height.

If the controller determines that the vehicle settings are not set to keep raising the vehicle, method 1000 continues to F and includes step 1060 (see FIG. 10F).

If the controller determines that the height of the vehicle is above the threshold height, method 1000 continues to step 1076 and includes determining whether the vehicle height is at the static height (e.g., in the static position).

If method 1000 determines that the vehicle is in the static position at step 1076, method 1000 continues to step 1080 and includes maintaining the vehicle at the static height. Method 1000 may then return.

In some examples, the height of the skateboard chassis of the vehicle may be adjusted, e.g., lowered and raised, when the vehicle is not stopped. For example, the vehicle may be anticipated to stop based on detection of depression of a brake pedal and/or a decrease in vehicle speed. The vehicle may also be anticipated to stop when approaching a destination indicated to be a scheduled stop on a travel route of the vehicle. The anticipated stoppage, in combination with reception of sensor input indicating a request for height adjustment, may activate height adjust while the vehicle is in motion. As an example, the height may be varied when the vehicle speed is low and near stopping, e.g., the vehicle speed is within a threshold of zero vehicle speed. The request for height adjustment may be indicated based on a voice command, an identified location of the vehicle based on a GPS signal, a user gesture, or depression of a key fob button, as described above. The height adjustment may commence when the vehicle is within the threshold of zero vehicle speed and the request for height adjustment is indicated.

A combination of the anticipated vehicle stoppage and the request for height adjustment may activate a change in the skateboard chassis height while the vehicle is slowing to a stop, thereby reducing an amount of time for the height adjustment. For example, by initiating the height adjustment prior to zero vehicle speed, an amount of time for the height adjustment to be completed may be reduced in comparison to when the height adjustment is conducted only after the vehicle is stopped.

In this way, an electric commercial vehicle with a skateboard chassis may be lowered and raised based on at least one of a user input, a sensor input, and an operating condition. For example, the electric commercial vehicle with the skateboard chassis may include an adjustable suspension system comprising a front suspension system and a rear suspension system. Each of the front suspension system and the rear suspension system may include an air spring for adjusting a height of the skateboard chassis. By lowering the skateboard chassis into a kneeling position, a loading and unloading process may be facilitated, which may increase customer satisfaction and ease of user. Further, by increasing vehicle ease of use, vehicle safety may also be increased. For example, the skateboard chassis may be lowered into the kneeling position based on at least one of a user input, a sensor input, and an operating condition.

The technical effect of lowering a skateboard chassis of an electric commercial vehicle is that a vehicle floor may be closer to the ground in a kneeling position relative to a nominal position, which may facilitate loading and unloading the vehicle, in addition to increasing user safety.

FIGS. 1-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during a vehicle stop event, adjusting a height of a skateboard frame of an electric vehicle via an adjustable suspension system, based on at least one sensor input indicative of a desired skateboard frame height;
responsive to the skateboard frame at a first height and the desired skateboard frame height being a second height, lowering the skateboard frame to the second height via the adjustable suspension system, the second height less than the first height;
responsive to the skateboard frame at the second height and the desired skateboard frame height being the first height, raising the skateboard frame to the first height via the adjustable suspension system;
responsive to the skateboard frame at the first height and the desired skateboard frame height being a third height, lowering the skateboard frame to the third height via the adjustable suspension system, the third height less than the second height;
responsive to the skateboard frame at the second height and the desired skateboard frame height being the third height, lowering the skateboard frame to the third height via the adjustable suspension system;
responsive to the skateboard frame at the third height and the desired skateboard frame height being the second height, raising the skateboard frame to the second height via the adjustable suspension system; and
responsive to the skateboard frame at the third height and the desired skateboard frame height being the first height, raising the skateboard frame to the first height via the adjustable suspension system.

2. The method of claim 1, wherein the adjustable suspension system is coupled to the skateboard frame, the adjustable suspension system comprising a front suspension system and a rear suspension system, each of the front suspension system and the rear suspension system including at least one pressurized spring.

3. The method of claim 2, wherein adjusting the height of the skateboard frame of the electric vehicle via the adjustable suspension system includes adjusting an amount of air in the at least one pressurized spring of the front suspension system and adjusting an amount of air in the at least one pressurized spring of the rear suspension system.

4. The method of claim 1, wherein the desired skateboard frame height is determined based on one of a user position and a user request.

5. The method of claim 4, wherein the user position is determined based on the at least one sensor input indicative of the desired skateboard frame height, the at least one sensor input indicative of the desired skateboard frame height including one or more of a proximity sensor, a motion sensor, a strength of a wireless connection to a key fob, a key fob button press, a camera feed, and a voice command.

6. The method of claim 1, wherein the skateboard frame houses a battery pack, the battery pack providing power to the electric vehicle.

7. The method of claim 1, wherein the vehicle stop event is determined in response to at least one of a speed of the electric vehicle being zero, a driver-requested stop, and the electric vehicle in a park gear.

8. A method, comprising:
responsive to an expected vehicle stop event,
adjusting a height of a skateboard frame of an electric vehicle via an adjustable suspension system, based on at least one sensor input indicative of a desired skateboard frame height;
wherein adjusting the height of the skateboard frame includes modifying the height upon detecting a request for stopping the vehicle; and
wherein adjusting the height based on the at least one sensor input, includes detecting one or more of a voice command, a user gesture, or a key fob button press.

9. The method of claim 8, wherein detecting the request for stopping the vehicle includes detecting actuation of a brake pedal.

10. The method of claim 8, wherein detecting the request for stopping the vehicle includes detecting a decrease in speed of the vehicle.

11. The method of claim 8, wherein detecting the request for stopping vehicle is activated based on GPS data indicating that the vehicle is approaching a scheduled stop location.

12. The method of claim 8, wherein adjusting the height of the skateboard frame of the electric vehicle includes adjusting the height when the vehicle is moving at speed within a threshold of zero speed.

13. The method of claim 8, wherein the at least one sensor input is the key fob button press.

14. The method of claim 1, wherein the at least one sensor input includes detecting one or more of a voice command, a user gesture, or a key fob button press.

* * * * *